(12) United States Patent
Chappalli et al.

(10) Patent No.: US 12,298,181 B2
(45) Date of Patent: May 13, 2025

(54) SYSTEMS AND METHODS FOR CROSSTALK MITIGATION BETWEEN AMBIENT LIGHT SENSOR AND ELECTRONIC DISPLAY

(71) Applicant: Apple Inc., Cupertino, CA (US)

(72) Inventors: Mahesh B Chappalli, San Jose, CA (US); Ionut A Mirel, Cupertino, CA (US); Yan Guan, Santa Clara, CA (US); Akshay Bhat, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/411,987

(22) Filed: Jan. 12, 2024

(65) Prior Publication Data

US 2025/0076111 A1    Mar. 6, 2025

Related U.S. Application Data

(60) Provisional application No. 63/536,885, filed on Sep. 6, 2023.

(51) Int. Cl.
*G01J 1/44* (2006.01)
*G01J 1/42* (2006.01)
*G09G 3/32* (2016.01)

(52) U.S. Cl.
CPC ............ *G01J 1/44* (2013.01); *G01J 1/4204* (2013.01); *G09G 3/32* (2013.01); *G01J 2001/444* (2013.01); *G09G 2360/144* (2013.01)

(58) Field of Classification Search
CPC ...... G01J 1/44; G01J 1/4204; G01J 2001/444; G09G 3/32; G09G 2360/144
See application file for complete search history.

(56) References Cited

U.S. PATENT DOCUMENTS

| | | | | |
|---|---|---|---|---|
| 9,406,277 | B1 * | 8/2016 | Letourneur | G09G 5/10 |
| 10,187,936 | B1 * | 1/2019 | Letourneur | G09G 3/3406 |
| 11,107,395 | B2 * | 8/2021 | Chen | G09G 5/10 |
| 11,145,249 | B1 * | 10/2021 | Han | G09G 3/32 |

(Continued)

FOREIGN PATENT DOCUMENTS

WO    2018119161 A1    6/2018

*Primary Examiner* — William Lu
(74) *Attorney, Agent, or Firm* — Fletcher Yoder, P.C.

(57) ABSTRACT

To mitigate undesirable outcomes due to crosstalk in an ambient light sensor reading resulting from light emission from an electronic display, statistics may be gathered to determine and compensate for the crosstalk. For example, the ambient light sensor may detect ambient light levels while the electronic display is temporarily paused to reduce or eliminate crosstalk between the light produced by the electronic display and the ambient light sensor. However, the ambient light sensor may retain charge from a previous light emission, creating back-emission crosstalk. The ratio of back-emission to front-emission (e.g., present light emission) may not be linear, and the degree of nonlinearity may vary with pixel value, color component, display brightness, temperature, and so on. As the ambient light sensor is affected by back-emission, compensation for the nonlinearity between the front-emission and the back-emission may be obtained to estimate the crosstalk induced on the ambient light sensor.

20 Claims, 17 Drawing Sheets

(56) References Cited

U.S. PATENT DOCUMENTS

| | | | |
|---|---|---|---|
| 2001/0032921 A1* | 10/2001 | Forsberg | H04B 10/6911 250/214.1 |
| 2006/0250330 A1* | 11/2006 | Fish | H10K 59/13 345/76 |
| 2009/0167676 A1* | 7/2009 | Edwards | G09G 3/3406 340/600 |
| 2010/0295860 A1* | 11/2010 | Somerville | G09G 3/3216 345/545 |
| 2012/0256081 A1* | 10/2012 | Tsunetsugu | H03K 17/78 250/214.1 |
| 2013/0215360 A1* | 8/2013 | Pollack | G09G 5/02 349/61 |
| 2014/0192079 A1* | 7/2014 | Lee | G09G 3/2003 345/597 |
| 2014/0267202 A1* | 9/2014 | Zheng | G01J 1/10 345/207 |
| 2016/0163260 A1* | 6/2016 | Takahashi | G09G 3/3233 345/207 |
| 2017/0208263 A1* | 7/2017 | McGarry | H04N 25/00 |
| 2017/0328767 A1* | 11/2017 | Zheng | G01J 1/44 |
| 2018/0226054 A1* | 8/2018 | Li | G06T 1/20 |
| 2018/0324327 A1* | 11/2018 | Moribe | H04N 1/6019 |
| 2019/0355302 A1* | 11/2019 | Ding | G09G 3/3275 |
| 2020/0007798 A1* | 1/2020 | Liu | H04N 25/532 |
| 2020/0014419 A1* | 1/2020 | Hannebauer | H04B 1/707 |
| 2020/0294468 A1* | 9/2020 | Hung | G09G 5/10 |
| 2021/0090509 A1* | 3/2021 | Zheng | H03F 3/087 |
| 2021/0176488 A1* | 6/2021 | Yoshida | H04N 19/577 |
| 2021/0241718 A1* | 8/2021 | Tsubokura | G09G 5/10 |
| 2021/0335251 A1* | 10/2021 | Liu | G09G 3/3233 |
| 2021/0405410 A1* | 12/2021 | Wang | B60K 35/22 |
| 2022/0050984 A1* | 2/2022 | Park | G06V 40/1318 |
| 2022/0114928 A1* | 4/2022 | Atkins | G02B 5/208 |
| 2022/0155143 A1* | 5/2022 | Moeneclaey | G01J 1/46 |
| 2022/0155144 A1* | 5/2022 | Malinge | H04N 25/53 |
| 2022/0172676 A1* | 6/2022 | Nelson | G09G 5/003 |
| 2022/0254843 A1* | 8/2022 | Barel | H10K 59/40 |
| 2022/0328797 A1* | 10/2022 | Zeng | G06V 10/143 |
| 2023/0397310 A1* | 12/2023 | Miyata | H05B 45/10 |
| 2024/0087183 A1* | 3/2024 | Hamer | G06T 11/001 |
| 2024/0304161 A1* | 9/2024 | Alleysson | G01J 3/28 |

* cited by examiner

SYSTEMS AND METHODS FOR CROSSTALK MITIGATION BETWEEN AMBIENT LIGHT SENSOR AND ELECTRONIC DISPLAY

CROSS-REFERENCE TO RELATED APPLICATIONS

This application claims priority to U.S. Application No. 63/536,885, filed Sep. 6, 2023, entitled "System and Methods for Crosstalk Mitigation Between Ambient Light Sensor and Electronic Display," which is incorporated by reference herein in its entirety for all purposes.

BACKGROUND

This disclosure relates to systems and methods for reducing or eliminating crosstalk between an under-display ambient light sensor and an electronic display.

A summary of certain embodiments disclosed herein is set forth below. It should be understood that these aspects are presented to provide the reader with a brief summary of these certain embodiments and that these aspects are not intended to limit the scope of this disclosure.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (μLEDs). By causing different display pixels to emit different amounts of light, individual display pixels of an electronic display may collectively produce images.

Image data for display on an electronic display may be adjusted to account for a variety of factors. For example, by measuring a brightness or color temperature of ambient light using an ambient light sensor, image processing circuitry may adjust image data and/or a global display brightness value (DBV) for the electronic display. In some cases, light emission by the electronic display may be briefly paused to allow the ambient light sensor to sense the ambient light of the environment to reduce or eliminate interference on the ambient light sensor caused by the electronic display. Even so, the ambient light sensor may experience lingering effects of the previous light emission (e.g., back-emission) from the electronic display even after the electronic display has been turned off. Detecting light from the electronic display instead of from the ambient light may lead to erroneous adjustments that are not appropriate for the ambient light of the environment. Such erroneous adjustments may result in front-of-screen (FoS) artifacts, which may negatively impact user experience.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To mitigate undesirable outcomes such as FoS artifacts due to crosstalk in an ambient light sensor reading resulting from light emission from an electronic display, statistics may be gathered to determine and compensate for the crosstalk. For example, the ambient light sensor may detect ambient light levels while the electronic display is temporarily paused to reduce or eliminate crosstalk between the light produced by the electronic display and the ambient light sensor. However, the ambient light sensor may retain charge from a previous light emission, creating back-emission crosstalk. The ratio of back-emission to front-emission (e.g., present light emission) may not be linear, and the degree of nonlinearity is expected to vary with pixel value, color component, display brightness, temperature, and so on.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
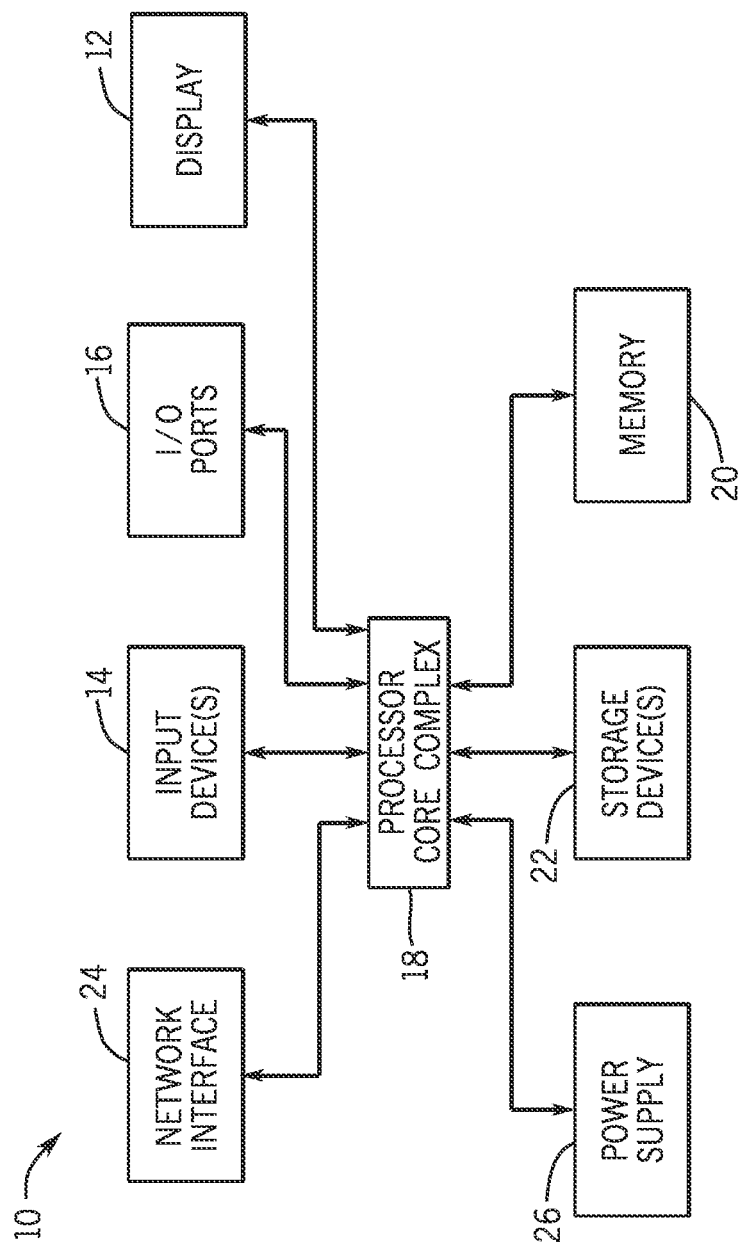
FIG. 1 is a block diagram of an electronic device having an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

To mitigate undesirable outcomes such as FoS artifacts due to crosstalk in an ambient light sensor reading resulting from light emission from an electronic display, statistics may be gathered to determine and compensate for the crosstalk. For example, the ambient light sensor may detect ambient light levels while the electronic display is temporarily paused to reduce or eliminate crosstalk between the light produced by the electronic display and the ambient light sensor. However, the ambient light sensor may retain charge from a previous light emission of a previous image frame after an emission period, creating back-emission crosstalk. For example, the light produced by the electronic display may cause a photodiode of the ambient light sensor to generate electric charge while the display is on and the pixels of the display are emitting light. When the electronic display turns off and the pixels stop emitting, the charge may not immediately decay and die away. Accordingly, the photodiode may exhibit some hysteresis based on the previous light emission as the display. This hysteresis may be referred to as "back emission." The amount of back-emission may correspond to the amount of light received from the electronic display. The ratio of back-emission to front-emission (e.g., present light emission of a present image frame) may not be linear, and the degree of nonlinearity is expected to vary with pixel value, color component, display brightness, temperature, and so on. As the pixel pipeline may operate linearly with respect to the display front-emission and the ambient light sensor is affected by back-emission, compensation for the nonlinearity between the front-emission and the back-emission may be obtained to estimate the crosstalk induced on the ambient light sensor by the electronic display.

With this in mind, an example of an electronic device 10, which includes an electronic display 12 that may benefit from these features, is shown in FIG. 1. FIG. 1 is a schematic block diagram of the electronic device 10. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a wearable device, a watch, a vehicle dashboard, and/or the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor core complex 18 having one or more processors or processor cores and/or image processing circuitry, memory 20, one or more storage devices 22, a network interface 24, and a power supply 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the storage devices 22 may be included in a single component. Additionally or alternatively, image processing circuitry of the processor core complex 18 may be disposed as a separate module or may be disposed within the electronic display 12.

The processor core complex 18 is operably coupled with the memory 20 and the storage device 22. As such, the processor core complex 18 may execute instructions stored in memory 20 and/or a storage device 22 to perform operations, such as generating or processing image data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as image data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a fourth-generation wireless network (4G), LTE, or fifth-generation wireless network (5G), or the like. In other words, the network interface 24 may enable the electronic device 10 to transmit data (e.g., image data) to a communication network and/or receive data from the communication network.

The power supply 26 may provide electrical power to operate the processor core complex 18 and/or other components in the electronic device 10, for example, via one or more power supply rails. Thus, the power supply 26 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as image data, with the portable storage device.

The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12, as described further herein. The touch sensing components may receive user inputs by detecting occurrence and/or position of an object contacting the display surface of the electronic display 12.

In addition to enabling user inputs, the electronic display 12 may provide visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. The display pixels may represent sub-pixels that each control a luminance of one color component (e.g., red, green, or blue for a red-green-blue (RGB) pixel arrangement).

The electronic display 12 may display an image by controlling the luminance of its display pixels based at least in part image data associated with corresponding image pixels in image data. In some embodiments, the image data may be generated by an image source, such as the processor core complex 18, a graphics processing unit (GPU), an image sensor, and/or memory 20 or storage devices 22. Additionally, in some embodiments, image data may be received from another electronic device 10, for example, via the network interface 24 and/or an I/O port 16.

Figure 2:
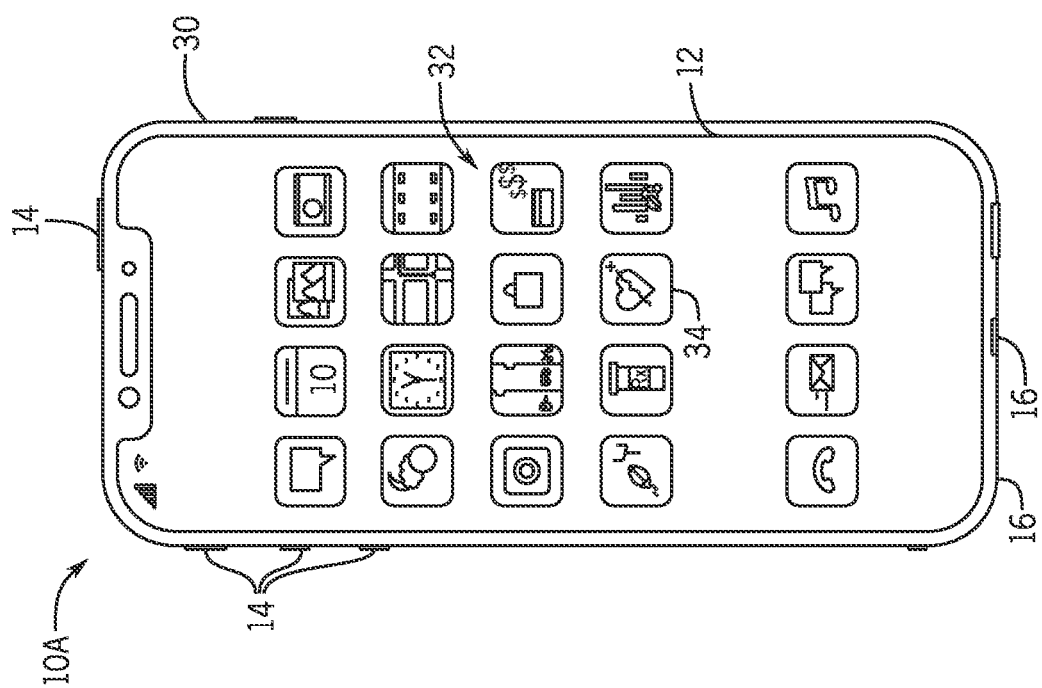
FIG. 2 is an example of the electronic device in the form of a handheld device, in accordance with an embodiment.

One example of the electronic device 10, specifically a handheld device 10A, is shown in FIG. 2. FIG. 2 is a front view of the handheld device 10A representing an example of the electronic device 10. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 30 (e.g., housing). The enclosure 30 may protect interior components from physical damage and/or shield them from electromagnetic interference. In the depicted embodiment, the electronic display 12 is displaying a graphical user interface (GUI) 32 having an array of icons 34. By way of example, when an icon 34 is selected either by an input device 14 or a touch sensing component of the electronic display 12, an application program may launch.

Input devices 14 may be provided through the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 30. The I/O ports 16 may include, for example, a Lightning® or Universal Serial Bus (USB) port.

Figure 3:
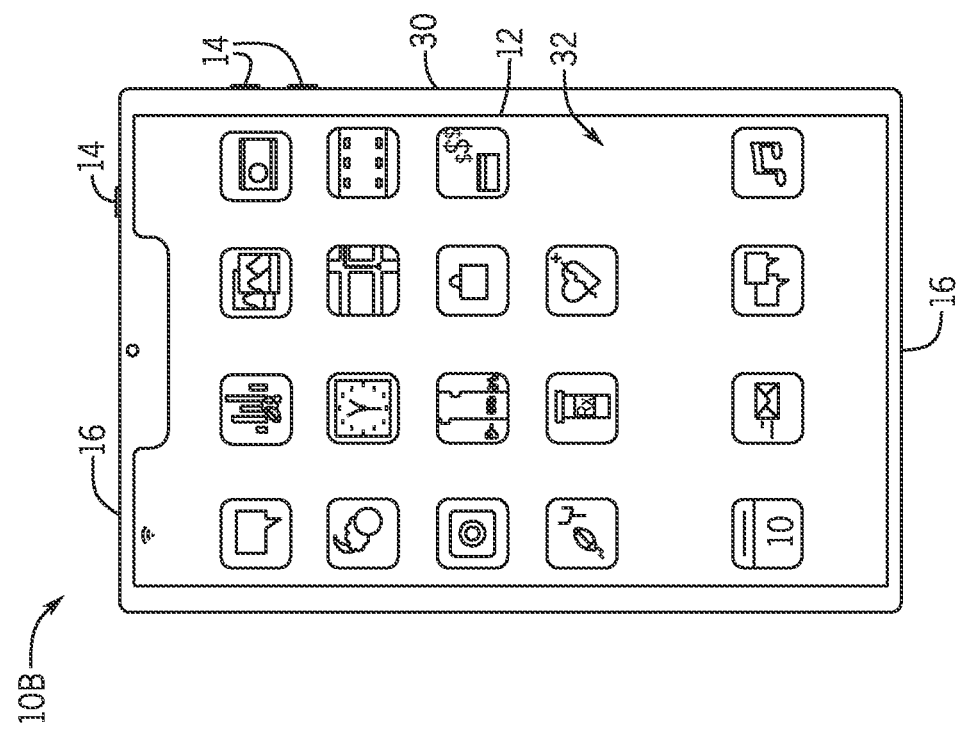
FIG. 3 is an example of the electronic device in the form of a tablet device, in accordance with an embodiment.
Figure 4:
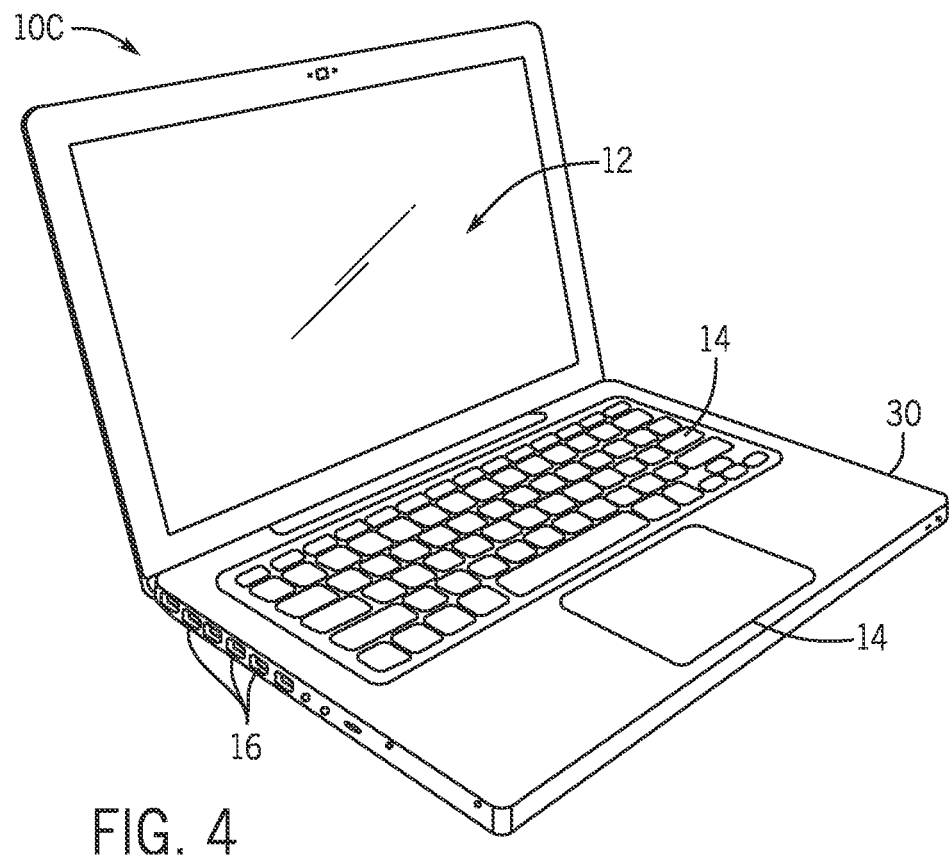
FIG. 4 is an example of the electronic device in the form of a notebook computer, in accordance with an embodiment.
Figure 5:
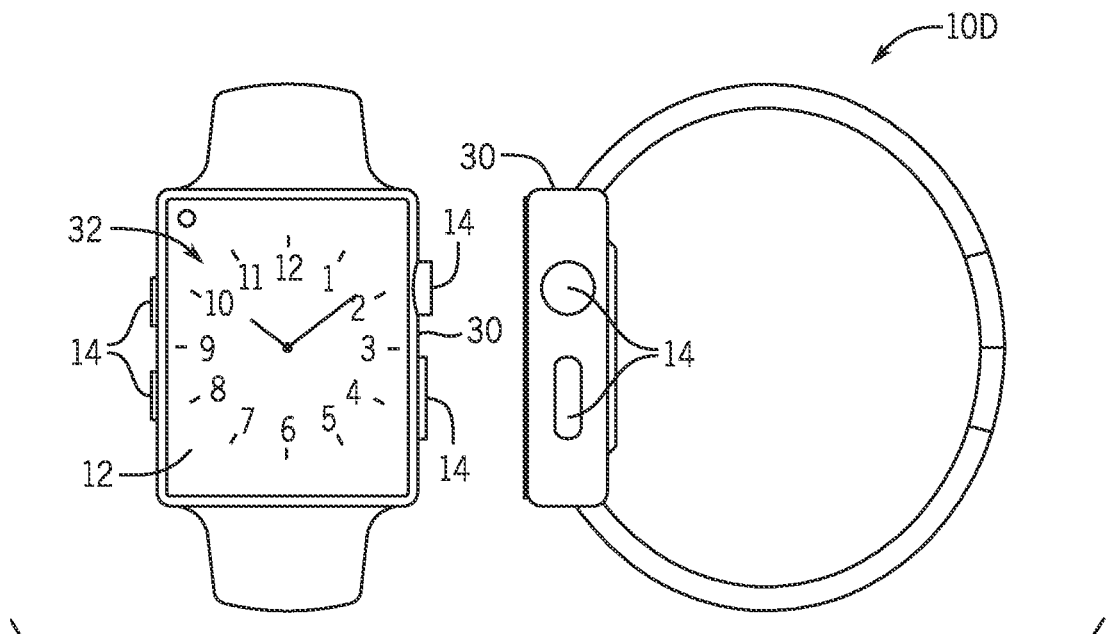
FIG. 5 is an example of the electronic device in the form of a wearable device, in accordance with an embodiment.

The electronic device 10 may take the form of a tablet device 10B, as shown in FIG. 3. FIG. 3 is a front view of the tablet device 10B representing an example of the electronic device 10. By way of example, the tablet device 10B may be any iPad® model available from Apple Inc. A further example of a suitable electronic device 10, specifically a computer 10C, is shown in FIG. 4. FIG. 4 is a front view of the computer 10C representing an example of the electronic device 10. By way of example, the computer 10C may be any MacBook® or iMac® model available from Apple Inc. Another example of a suitable electronic device 10, specifically a watch 10D, is shown in FIG. 5. FIG. 5 are front and side views of the watch 10D representing an example of the electronic device. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 30.

Figure 6:
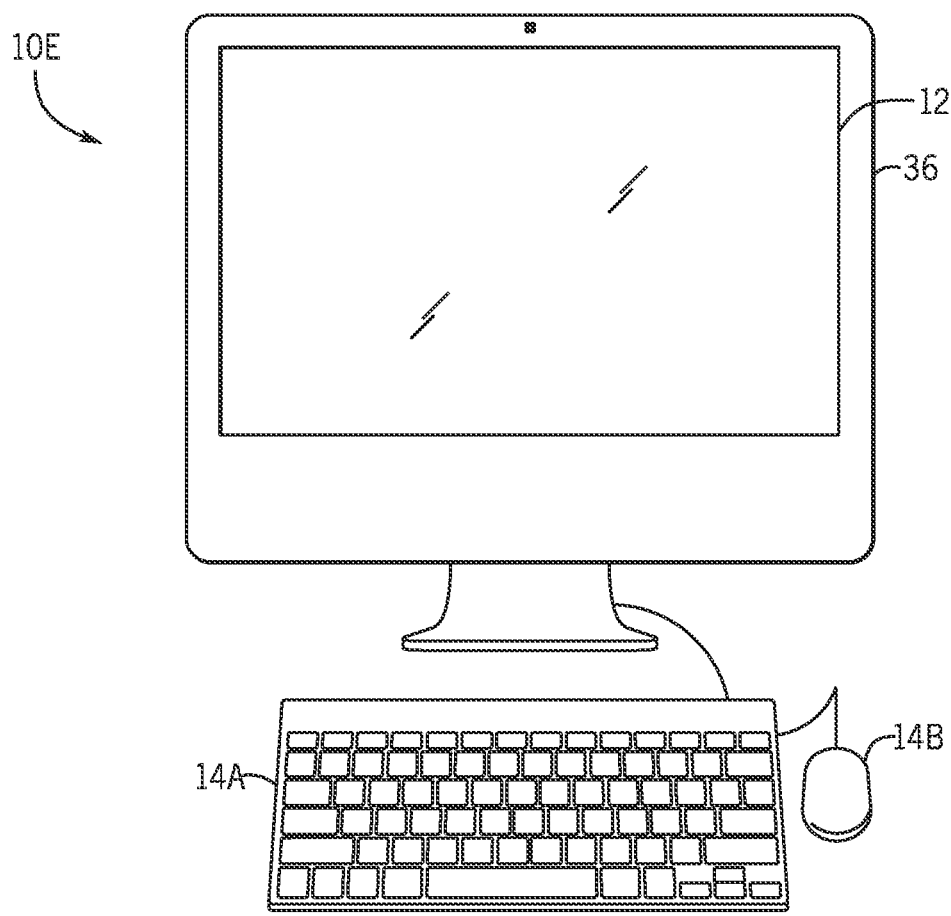
FIG. 6 is an example of the electronic device in the form of a desktop computer, in accordance with an embodiment.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input devices 14, such as the keyboard 14A or mouse 14B (e.g., input devices 14), which may connect to the computer 10E.

Figure 7:
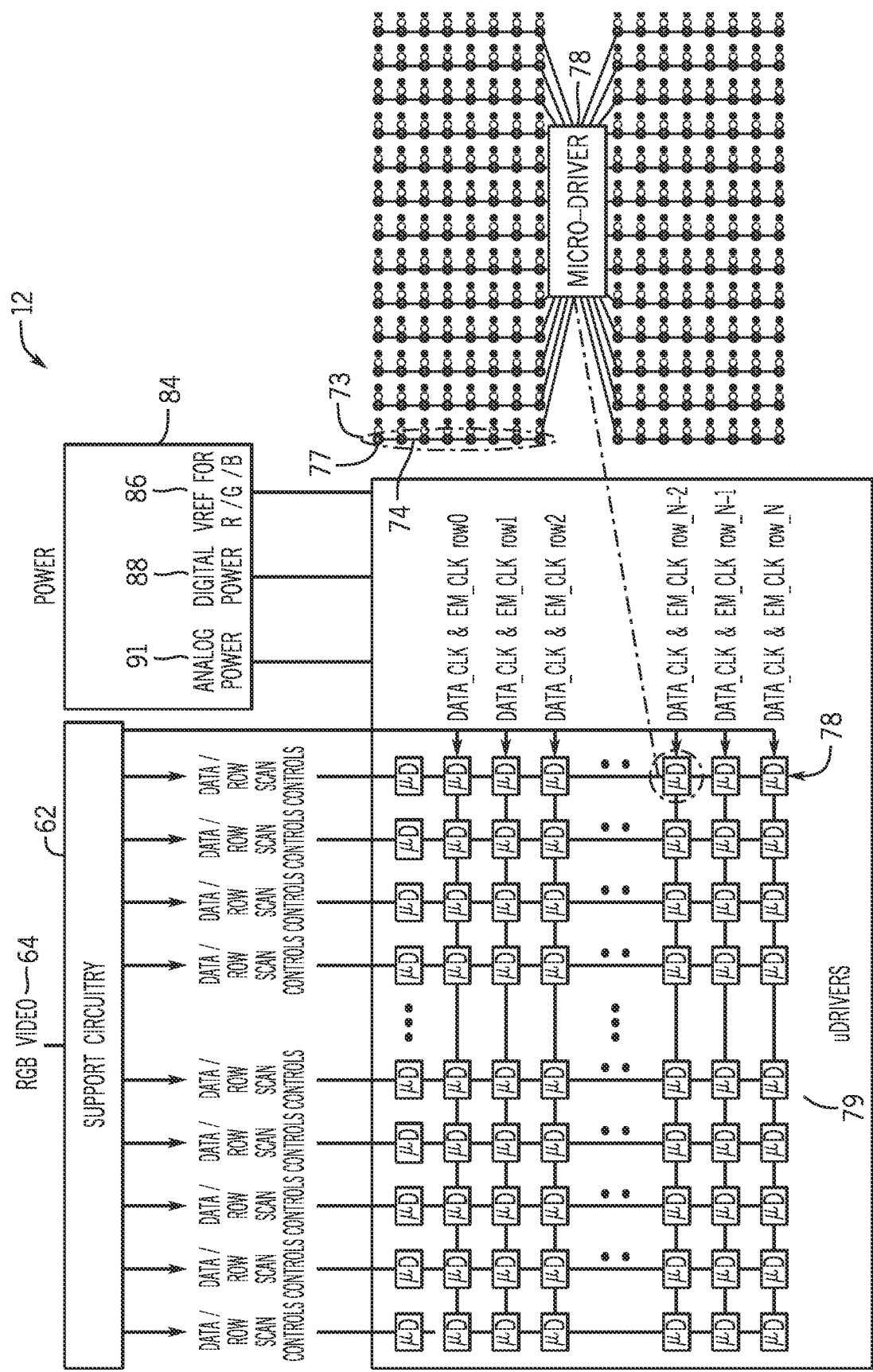
FIG. 7 is a schematic diagram of a micro-LED display that employs micro-drivers to drive display pixels with control signals, in accordance with an embodiment.

FIG. 7 depicts a block diagram of an example architecture of the electronic display 12 (e.g., micro-LED display). In the example of FIG. 7, the electronic display 12 uses an RGB display panel 60 with pixels that include red, green, and blue micro-LEDs as display pixels. Support circuitry 62 may receive RGB-format video image data 64. It should be appreciated, however, that the electronic display 12 may alternatively display other formats of image data, in which case the support circuitry 62 may receive image data of such different image format. In some embodiments, the support circuitry 62 may include a video timing controller (video TCON) and/or emission timing controller (emission TCON) that receives and uses the image data 64 in a serial bus to determine a data clock signal (DATA_CLK) and/or an emission clock signal (EM_CLK) to control the provision of the image data 64 in the electronic display 12. The video TCON may also pass the image data 64 to a serial-to-parallel circuitry that may deserialize the image data 64 signal into several parallel image data signals. That is, the serial-to-parallel circuitry may collect the image data 64 into the particular data signals that are passed on to specific columns among a total of M respective columns in the display panel 60. As noted above, the video TCON may generate the data clock signal (DATA_CLK), and the emission TCON may generate the emission clock signal (EM_CLK). Collectively, these may be referred to as Data/Row Scan Control signals, as illustrated in FIG. 7. As such, the data is labeled DATA/ROW SCAN CONTROLS. The data/row scan controls respectively contain image data corresponding to pixels in the first column, second column, third column, fourth column . . . fourth-to-last column, third-to-last column, second-to-last column, and last column, respectively. The data/row scan controls may be collected into more or fewer columns depending on the number of columns that make up the display panel 60.

In particular, the display panel 60 includes micro-drivers 78. The micro-drivers 78 are arranged in an array 79. Each micro-driver 78 drives a number of display pixels 77. The display pixels 77 driven by each micro-driver 78 may be arranged as a local passive matrix (LPM) 92. In one example, each micro-driver 78 drives two local passive matrices (LPMs) 92 of display pixels 77, one above the micro-driver 78 and one below the micro-driver 78. Before continuing, it should be appreciated that the array 79 may have LPM columns 94 that include multiple different LPMs 92 that are driven by different micro-drivers 78. For each LPM 92, different display pixels 77 may include different combination of colored micro-LEDs (e.g., a red micro-LED, a green micro-LED, or a blue micro-LED) to represent the image data 64 in RGB format. For example, the combinations may include a red micro-LED and a green micro-LED, a blue micro-LED and a green micro-LED, a red micro-LED and a blue micro-LED, and so on. Although one of the micro-drivers 78 of FIG. 7 is shown to drive a local passive matrix (LPM) 92 having twenty-six anode groups 73 having eight display pixels 77 each, each micro-driver 78 may drive more or fewer anode groups 73 and respective display pixels 77. As illustrated, the subset of display pixels 77 located on each anode group 73 may be associated with a particular color (e.g., red, green, blue). As mentioned above, it should be noted that a respective cathode corresponds to a subset of display pixels 77 associated with a particular color even though each cathode for a particular color channel is not illustrated in FIG. 7. For example, anode 74 corresponds to a red color channel (e.g., subset of red display pixels 77) and there may be a corresponding shared cathode for all color channels or a separate cathode corresponding to the red color channel. There are a second set of anodes that couple to a green color channel (e.g., subset of green display pixels 77) and a third set of anodes that couple to a blue color channel (subset of blue display pixels 77), but these are not expressly illustrated in FIG. 7 for ease of description. Each micro-driver 78 may drive one row of display pixels 77 of each LPM at a time.

A power supply 84 may provide a reference voltage (VREF) 86 to drive the micro-LEDs, a digital power signal 88, and an analog power signal 91. In some cases, the power supply 84 may provide more than one reference voltage (VREF) 86 signal. Namely, display pixels 77 of different colors may be driven using different reference voltages. As such, the power supply 84 may provide more than one reference voltage (VREF) 86. Additionally or alternatively, other circuitry on the display panel 60 may step the reference voltage (VREF) 86 up or down to obtain different reference voltages to drive different colors of micro-LED.

As previously stated, in some scenarios, a sensor may be disposed beneath a display panel of the electronic display 12 (e.g., to reduce a bezel size of the electronic display 12). In some embodiments, an under-display sensor (e.g., an ambient light sensor 90) may activate to collect and output data. For example, the ambient light sensor 90 may activate to detect ambient light in an environment around the electronic device 10. While the under-display sensor is discussed with respect to an ambient light sensor 90, it should be noted that the under-display sensor may include any appropriate type of sensor, component, or device. For example, the under-display sensor may include a fingerprint scanner, a thermal sensor, a proximity sensor, and so on.

The pixel pulses may enable control of the ambient light sensor 90 data collection during the off-pulses. Because the pixels are pulsed and the ambient light sensor 90 activates during a non-emission period, there may be no light remaining from the display pixels during the non-emission period. However, in some cases, the readings of ambient light sensor 90 may be inaccurate due to light emitted from the display pixels 77 of the electronic display 12. For example, if the ambient light sensor 90 tries to determine ambient light while the electronic display 12 is illuminated, crosstalk from the illuminated electronic display 12 may cause the ambient light sensor 90 to misread the ambient light and, consequently, may result in an erroneous adjustment to the electronic display 12 and associated undesirable effects (e.g., front of screen (FoS) artifacts). For example, an erroneous ambient light reading from the ambient light sensor 90 may result in a greater or lesser display brightness value (DBV) adjustment of the electronic display 12. The greater or lesser DBV may cause the image data to be brighter or darker than desired.

To reduce or mitigate the crosstalk, the ambient light sensor 90 may activate only when the electronic display 12 is turned off, such that the display pixels 77 emit no light and thus cause no crosstalk on the ambient light sensor 90. However, certain components of the electronic display 12 and/or the ambient light sensor 90 may retain some residual charge induced by a previous emission from the electronic display 12 that may persist after the electronic display 12 is turned off. As previously discussed, the residual charge may include photodiode hysteresis resulting from a previous image frame displayed on the electronic display 12, where light from the display pixels 77 emitting during the image frame imparted a charge on a photodiode that does not immediately decay when the display pixels 77 stop emitting. The crosstalk induced by a present emission (e.g., when the electronic display 12 is turned on and emitting light) may be referred to herein as front-emission crosstalk and the crosstalk induced by a previous emission may be referred to herein as back-emission crosstalk. Consequently, the residual charge may cause crosstalk on the ambient light sensor 90 even when no light is emitted from the electronic display 12. Moreover, the back-emission and the front-emission may be non-linear and thus in some cases different compensations may be applied to mitigate or eliminate back-emission crosstalk and front-emission crosstalk.

To mitigate undesirable outcomes such as FoS artifacts caused by the back-emission crosstalk, ambient light sensor statistics may be determined to estimate back-emission crosstalk between the ambient light sensor 90 and the electronic display 12. The back-emission crosstalk statistics may account for nonlinearities that may be present in an emission time-multiplexed electronic display. The crosstalk statistics may be used to offset the effects of crosstalk on the ambient light sensor 90, improving the image data and DBV adjustments.

Figure 8:
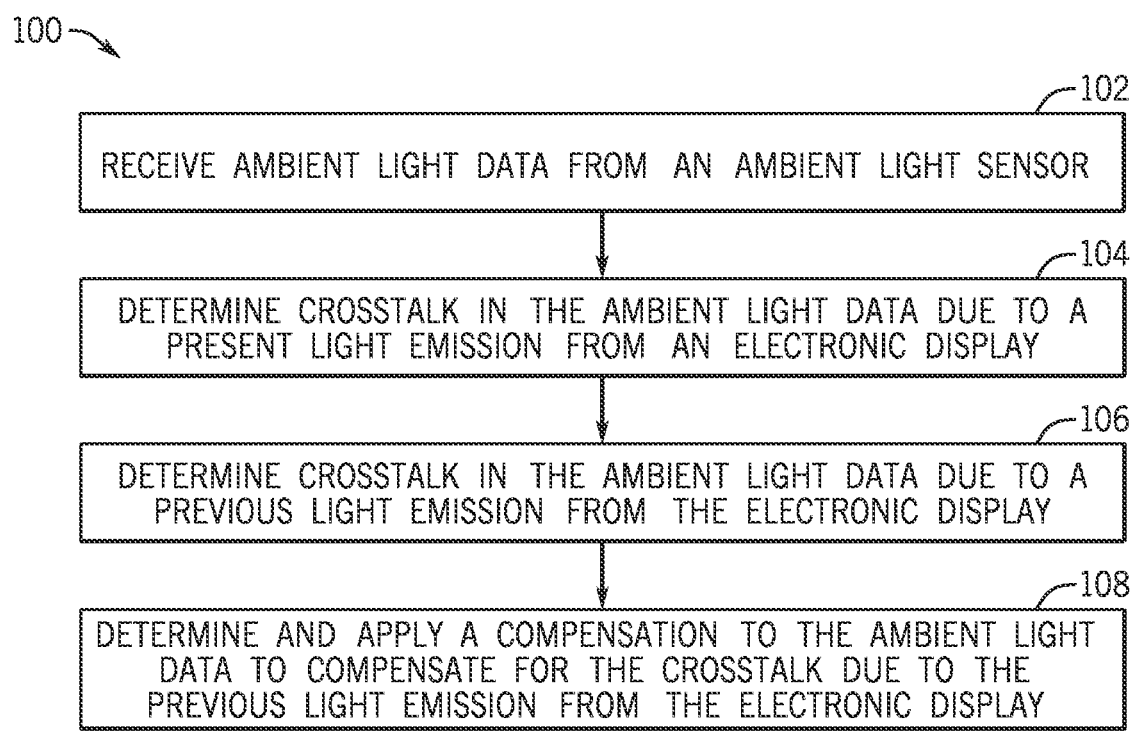
FIG. 8 is a flowchart of a method for determining ambient light crosstalk and applying a compensation to compensate for the crosstalk, in accordance with an embodiment.

FIG. 8 is a flowchart of a method 100 for determining ambient light crosstalk and applying a compensation to compensate for the crosstalk, according to embodiments of the present disclosure. Any suitable device (e.g., a controller) that may control components of the electronic device 10, such as the processor core complex 18, or various crosstalk collection and compensation circuitries may perform the method 100. In some embodiments, the method 100 may be implemented by executing instructions stored in a tangible, non-transitory, computer-readable medium, such as the memory 20 or storage devices 22, using the processor core complex 18. For example, the method 100 may be performed at least in part by one or more software components, such as an operating system of the electronic device 10, one or more software applications of the electronic device 10, and the like. While the method 100 is described using steps in a specific sequence, it should be understood that the present disclosure contemplates that the described steps may be performed in different sequences than the sequence illustrated, and certain described steps may be skipped or not performed altogether.

In process block 102 the processor core complex 18 receives ambient light data from the ambient light sensor 90. The ambient light data may include luminance data, color sensing data, or data relating to any characteristic of the ambient light. In process block 104, the processor core complex 18 determines crosstalk in the ambient light data due to a present light emission from the electronic display 12. The crosstalk due to present light emission may be referred to as front-emission crosstalk. In process block 106 the processor core complex 18 determines crosstalk in the ambient light data due to a previous light emission from the electronic display 12. The crosstalk due to the previous light emission may be referred to as back-emission crosstalk. Back-emission may result when the ambient light sensor 90 stores charge induced by a previous emission from the electronic display 12. This charge has a decay rate in the ambient light sensor 90 that may be accounted for to accurately determine and compensate for the back-emission cross talk.

The back-emission crosstalk may be nonlinear from the front-emission crosstalk, which may increase the difficulty of accounting for the back-emission crosstalk. In process block 108, the processor core complex 18 may determine and apply a compensation to the ambient light data to compensate for the back-emission crosstalk. To determine the compensation, crosstalk statistics may be gathered based on various characteristics of the front-emission and back-emission.

Figure 9:
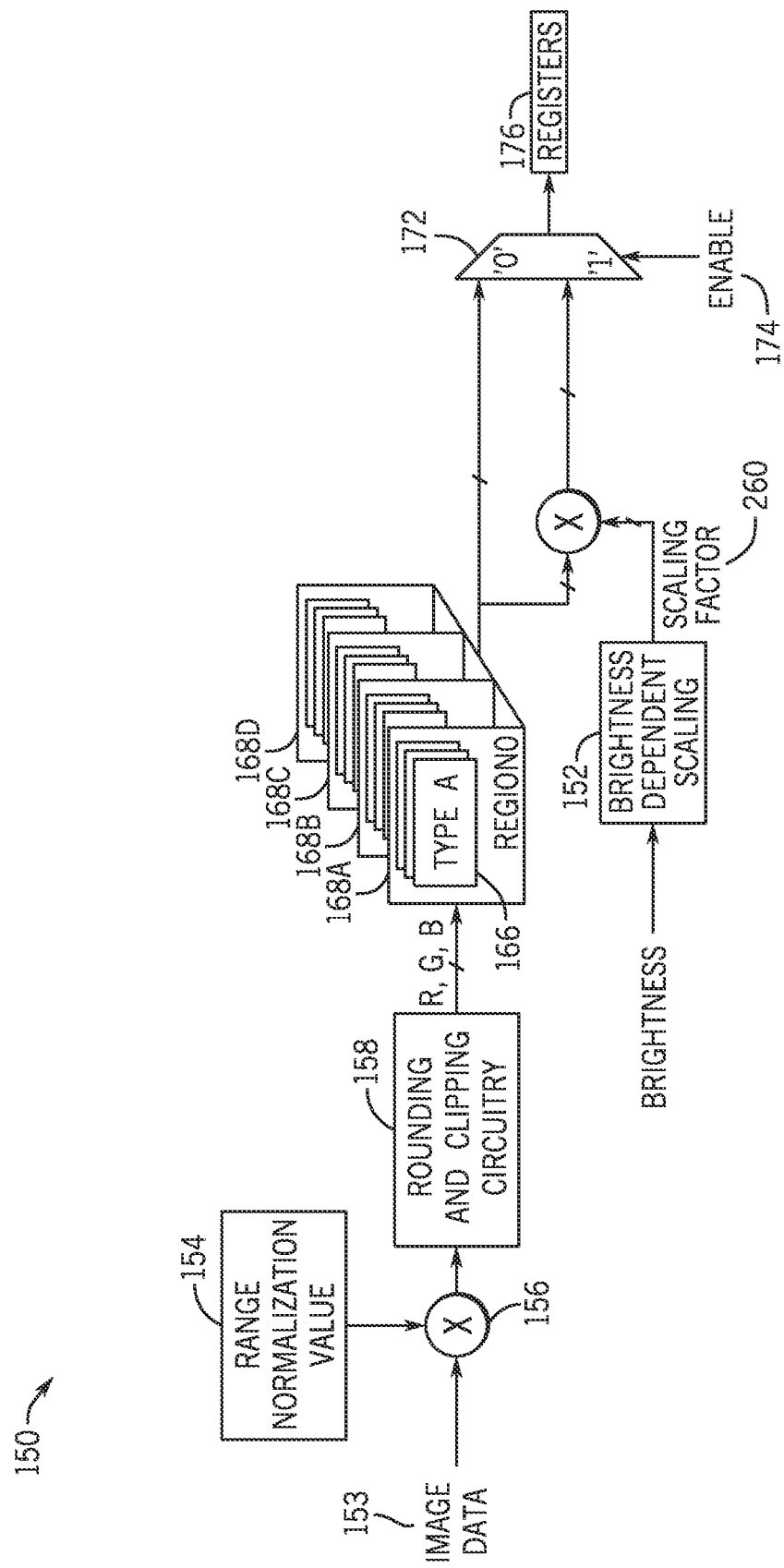
FIG. 9 is a flow diagram illustrating the collection of back-emission crosstalk statistics and compensating for the back-emission crosstalk via crosstalk compensation circuitry using brightness dependent scaling circuitry, in accordance with an embodiment.

FIG. 9 is a flow diagram illustrating the collection of back-emission crosstalk statistics and compensating for the back-emission crosstalk via crosstalk compensation circuitry 150 using brightness dependent scaling circuitry 152, according to embodiments of the present disclosure. As referred to herein, circuitry may include firmware, hardware, or software executed on general-purpose or dedicated hardware components. The crosstalk compensation circuitry 150 may determine crosstalk (e.g., front-emission crosstalk, back-emission crosstalk, or both) based on characteristics of the ambient light data received via the ambient light sensor 90, and compensate for the crosstalk by adjusting the image data for a subsequent image frame to correct for the crosstalk.

The crosstalk compensation circuitry 150 may apply to an electronic display 12 that supports determining only luminance of ambient light (e.g., supports one data channel) or to an electronic display 12 that supports determining luminance and color of the ambient light. That is, the electronic display 12 that supports determining luminance and color may support four data channels, including one channel for ambient light luminance, one channel for determining a red color component of the ambient light, one channel for determining a green color component of the ambient light, and one channel for determining a blue color component of the ambient light.

Measurements of the ambient light sensor 90 may be compensated based on displayed pixel values. Crosstalk statistics may be collected on pixel values before panel specific compensation, after linear domain panel specific compensation, before panel compensation related modifications, after intended luminance modifications, or after linear domain compensation.

Range normalization value 154 may be inputted into the crosstalk compensation circuitry 150 and may adjust input image data 153 via multiplier circuitry 156. The range normalization value 154 may be desirable as the ambient light sensor 90 may be capable of handling a wide range of brightness values. Range normalization may take a large brightness values (e.g., 32 bits, 64 bits, 128 bits, and so on) and normalizing the value to a value that may be handled by a processor (e.g., 8 bits). In some cases, a pixel burn-in compensation (BIC) may be employed and pixel values may be used for estimation of ambient light sensor 90 crosstalk statistics, which may cause inaccuracy in the statistics due to corrections applied subsequently in BIC, as the corrections are reflected in the light output of the display pixels 77. The BIC corrections may be accounted for by multiplying the input values to the crosstalk compensation circuitry 300 with the range normalization value 154. The range normalization value 154 may be adjusted via various operations that may occur in the rounding and clipping circuitry 158. For example, the range normalization value 154 may be bit-shifted, clipped to a particular (e.g., dynamically defined or predetermined) precision, rounded up or down, or any combination thereof. For example, if clipping circuitry clipped the bit value greater than or equal to a 22-bit precision (e.g., a 32-bit precision or more, a 64-bit precision or more, a 128 bit precision or more, and so on), the rounding circuitry may reduce the bit precision down to a sub-22-bit precision (e.g., 20-bit precision or less, 16-bit precision or less, 12-bit precision or less, 8-bit precision or less, and so on).

The rounding and clipping circuitry 158 may output the range normalization value 154 to one or more core units 166 associated with one or more region lookup tables (region LUTs) 168A, 168B, 168C, and 168D (collectively, the region LUTs 168) of the electronic display 12. The LUTs 168 may include lookup tables representing physical areas or regions of the electronic display around the ambient light sensor 90. If the region is closer to the ambient light sensor 90, the region LUT 168 corresponding to the near region may cause input image data from pixels in the near region to be input as RGB data at a first bit value (e.g., 12-bit), while if the region is further away from the ambient light sensor 90, the region LUT 168 corresponding to the far region may cause the input image data from the display pixels 77 in the region to be input as RGB data at a different bit value. In this way, the lookup tables corresponding to the regions may indicate the impact light from the display pixels 77 may have on the ambient light sensor 90. While four region LUTs 168 are illustrated, there may be any appropriate number of regions and corresponding region LUTs.

Figure 10:
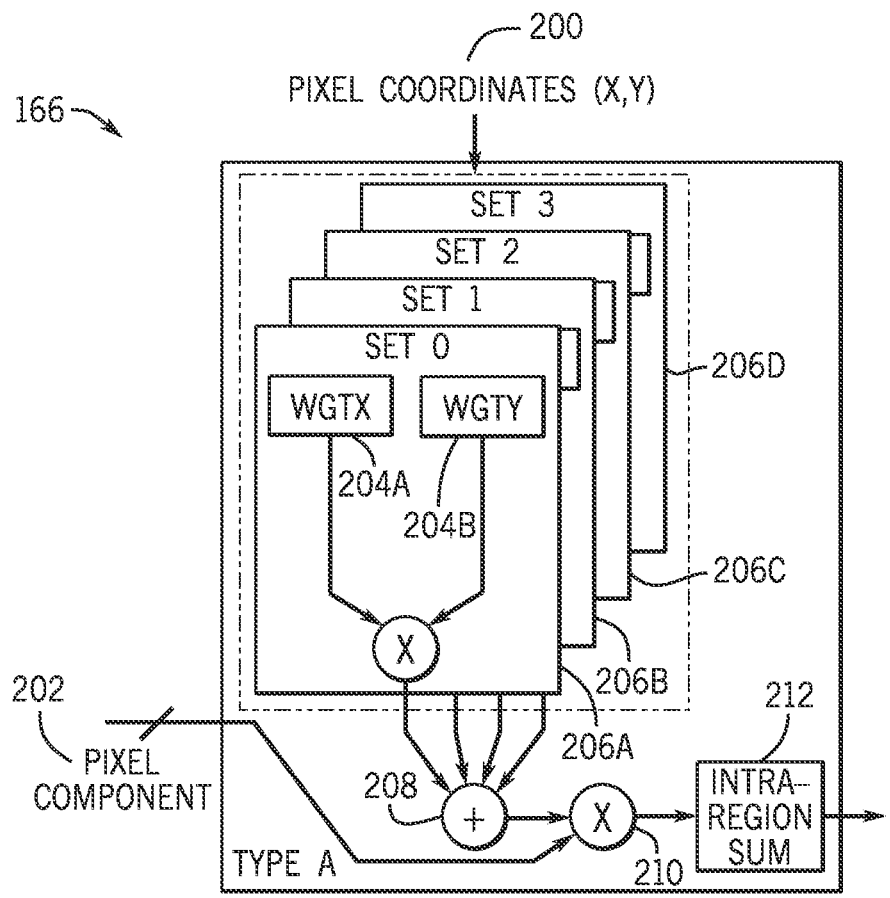
FIG. 10 is a block diagram of a core unit discussed with respect to the back-emission compensation circuitry of FIG. 9, in accordance with an embodiment.

FIG. 10 is a block diagram of the core unit 166. The crosstalk compensation circuitry 150 may support the core unit 166 for collection of weighted pixel statistics. The collection of weighted statistics may be based on inputs including pixel coordinates 200 and a pixel component 202. Weights may be two-dimensional (e.g., as indicated by weights 204A and 204B) and may characterize the crosstalk influence of the pixel component 202 on the ambient light sensor 90. In some cases, the two-dimensional weight distributions may not be perfectly separable and hence a singular value decomposition (SVD) approach may be employed to reconstruct the two-dimensional distribution.

The core unit 166 may support multiple sets of SVD basis vectors. For instance, the core unit 166 may support four sets of SVD basis vectors 206A, 206B, 206C, and 206D, (collectively, 206) as indicated in FIG. 10. A two-dimensional matrix of enables determines the region LUTs 168 and SVD basis vectors that may be enabled. The matrix may have dimensions of 4×1, with the first index representing a region 168. The number of SVD basis vectors 206 to be used for a given region is indicated by the value stored in the matrix at a corresponding location (e.g., indicated by the pixel coordinates 200). For example, a value of 0 at a location (m, 1) in the matrix indicates that the region m is disabled.

The SVD basis vectors 206A, 206B, 206C, and 206D may be summed at adding circuitry 208. The sum of the SVD basis vectors 206 may be multiplied by the pixel component 202 at the multiplier circuitry 210, the resulting product (e.g., the intra-region sum 212) may be output.

As previously mentioned, the back-emission of the electronic display 12 may be nonlinear with respect to display brightness changes. This nonlinear dependency may introduce nonlinear ambient light sensor counts, which may be corrected or compensated via a scaling factor applied via the brightness dependent scaling circuitry 152. The scaling factor to correct for the brightness dependency may be more heavily nonlinear for lower nit values and less heavily nonlinear (e.g., may be linear or near-linear) for greater nit values.

Figure 11:
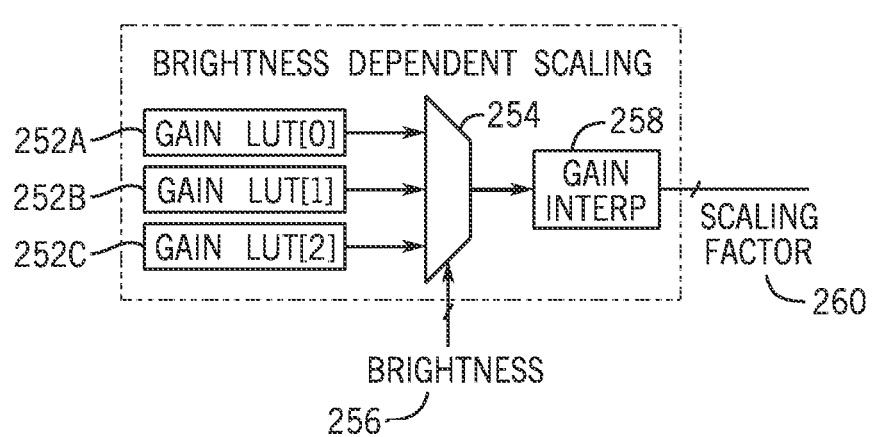
FIG. 11 is a block diagram of the brightness dependent scaling circuitry, in accordance with an embodiment.

FIG. 11 is a block diagram of the brightness dependent scaling circuitry 152, according to an embodiment of the present disclosure. The brightness dependent scaling circuitry 152 includes ambient light sensor gain lookup tables (gain LUTs) 252A, 252B, and 252C (collectively the gain LUTs 252). Each of the gain LUTs 252 may have unique input points, number of entries, spacing between input values, and coefficient quantization, as show in Table 1 below.

TABLE 1

| LUT | Input Points (Nit Ranges) | Number of Entries | Spacing Between Input Values | Coefficient Quantization |
| --- | --- | --- | --- | --- |
| Gain LUT [0] | 0-31 | 32 | 1 | u5.11 |
| Gain LUT [1] | 32-536 | 64 | 8 | u4.12 |
| Gain LUT [2] | 544-4512 | 32 | 128 | u3.13 |

The gain LUTs 252 may be applied independently on each color component. A multiplexer 254 may select, via the multiplexer 254, one of the gain LUTs 252A, 252B, or 252C based on a brightness level 256, wherein the brightness level 256 is the present brightness level of the electronic display 12. The gain LUT 252A may implement a mapping operation for the lower 32 brightness levels, and thus may store all scaling factors for the first 32 brightness levels. The gain LUT 252B and the gain LUT 252C may store scaling factors 260 at decimated brightness values with interpolation ratios defined by their respective spacing values via gain interpolation circuitry 258.

Returning to FIG. 9, when the enable 174 of the multiplexer 172 is high (1), the scaling factor 260 is multiplied by the intra-region sum 212 and output to the registers 176. The product of the scaling factor 260 and the intra-region sum 212 may be rounded and clamped at a particular bit value (e.g., 36 bits) before being output to the registers 176. When the enable 174 of the multiplexer 172 is low (0) the step of multiplying the intra-region sum 212 by the scaling factor 260 is bypassed, and the intra-region sum 212 is output by the multiplexer 172 to the registers 176.

Figure 12:
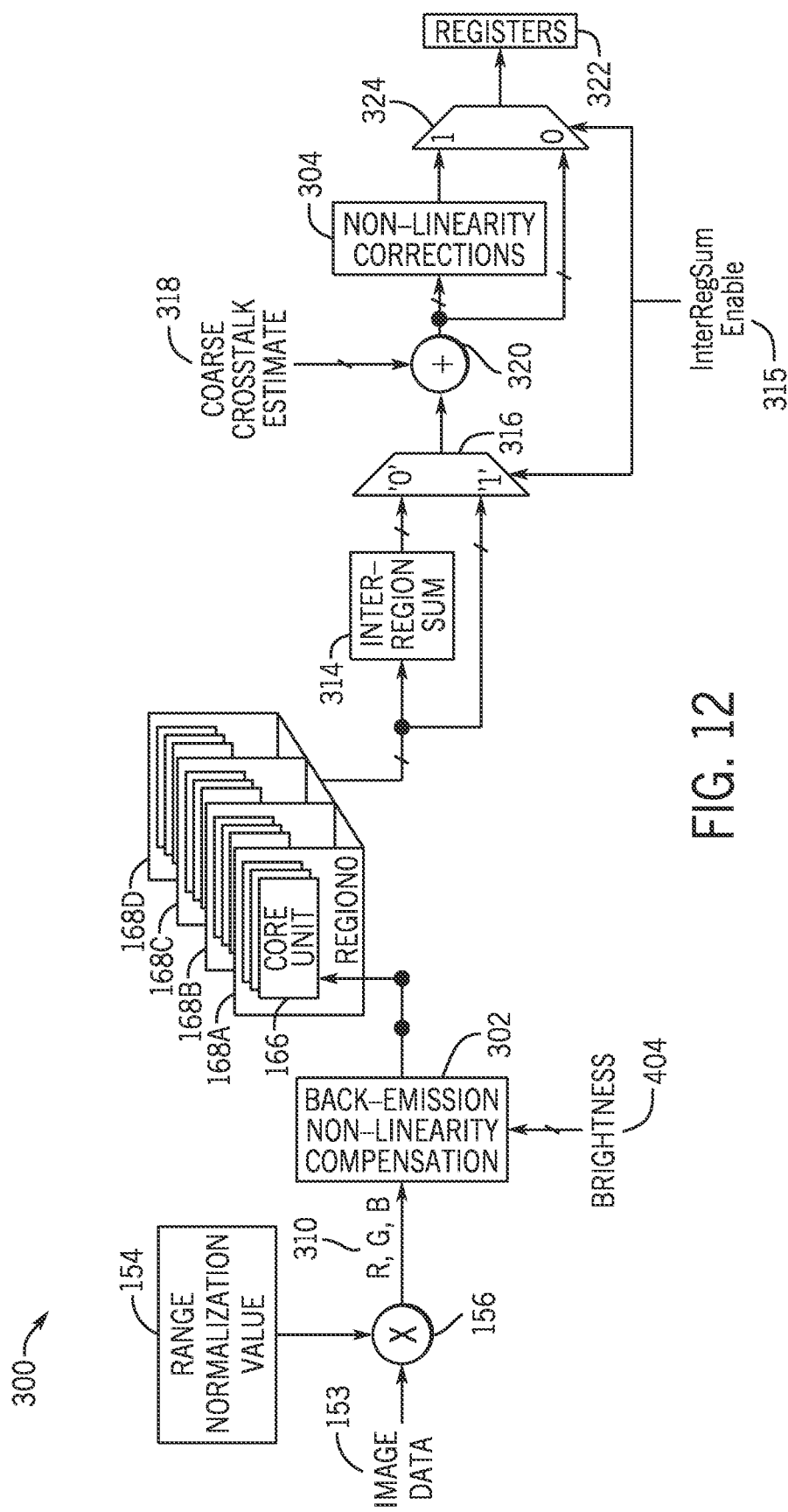
FIG. 12 is a flow diagram illustrating the operation of crosstalk compensation circuitry using back-emission nonlinearity compensation circuitry and nonlinearity correction, in accordance with an embodiment.

FIG. 12 is a flow diagram illustrating the operation of crosstalk compensation circuitry 300 using back-emission nonlinearity compensation circuitry 302 and nonlinearity correction circuitry 304, according to embodiments of the present disclosure. The flow diagram of FIG. 12 may apply to circuitry that supports determining only luminance of ambient light (e.g., supports one data channel) or to circuitry that supports determining luminance and color of the ambient light. That is, the circuitry that supports determining luminance and color may include one channel for ambient light luminance, one channel for determining a red color component of the ambient light, one channel for determining a green color component of the ambient light, and one channel for determining a blue color component of the ambient light.

The range normalization value 154 may be combined with a pixel component 310 to range normalize the pixel component 310. The pixel component 310 may be rounded to decrease the precision of the pixel component 310. For example, the pixel component 310 may be rounded down from a 22-bit value to a 12-bit value.

The pixel component 310 may be input to the back-emission nonlinearity compensation circuitry 302. As previously discussed, with respect to some electronic displays 12, the ratio of back-emission to front-emission may not be linear and the degree of nonlinearity is expected to vary with pixel value, color component, display brightness, temperature, and so on. As the pixel pipeline may operate linearly with respect to the display front-emission and the ambient light sensor 90 is affected by back-emission, compensation for the nonlinearity between the front-emission and the back-emission may be obtained to estimate the crosstalk induced on the ambient light sensor 90 by the electronic display 12. That is, the ambient light sensor data obtained by the ambient light sensor 90 may be compensated by a correction factor to assist in accurately determining an estimated amount of back-emission in the ambient light sensor data. The correction factor may adjust the gray levels associated with the ambient light sensor data. Gray level may be a measure of brightness or luminance of the display pixels 77. For example, for 8-bit data, a gray level of 0 is the lowest brightness (e.g., black) and a gray level of 255 is the highest brightness (e.g., white). However, the present disclosures may apply to any appropriate data size, such as 9-bit, 10-bit, and so on.

Figure 13:
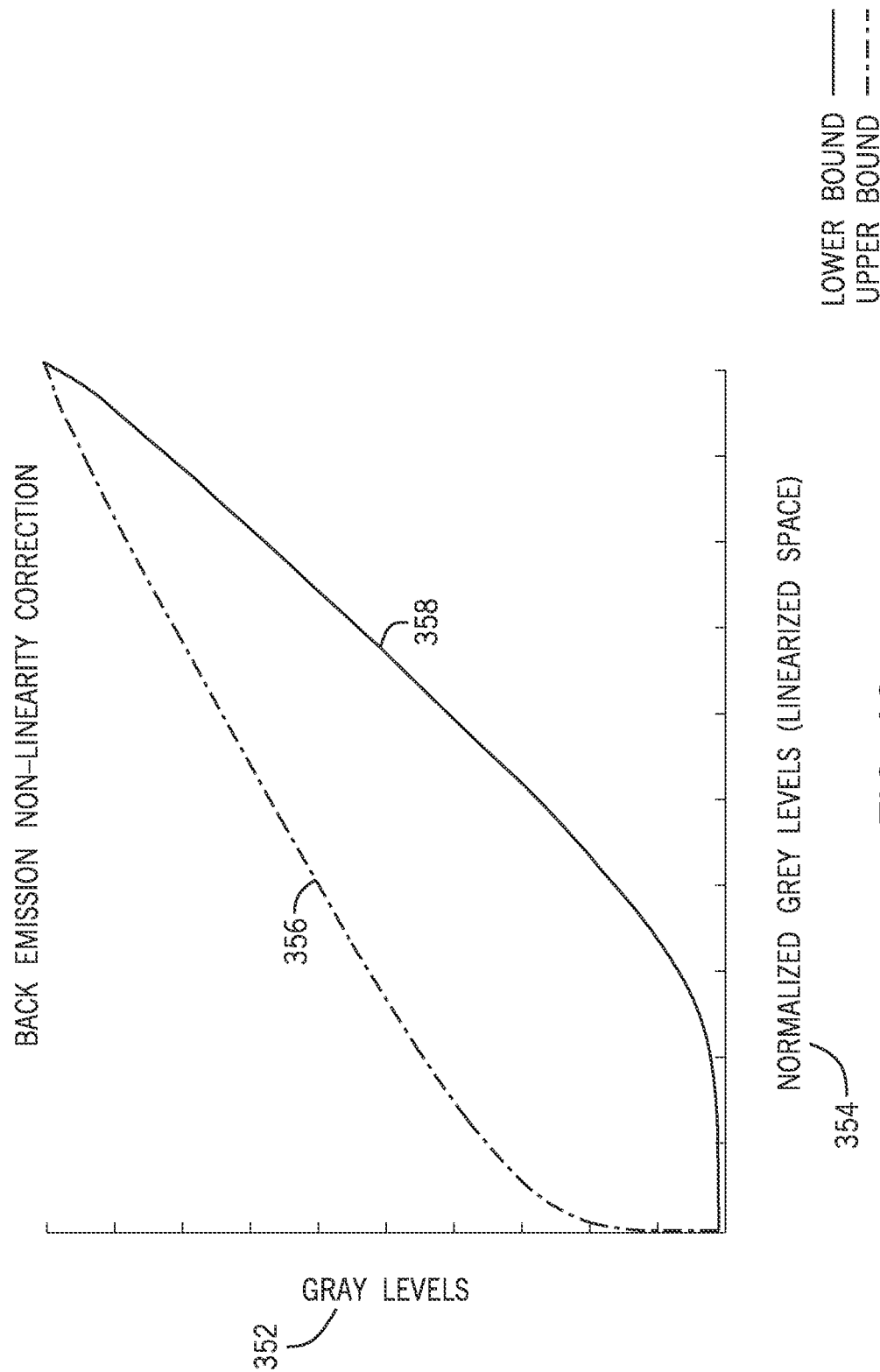
FIG. 13 illustrates examples of nonlinearity correction provided by the back-emission nonlinearity compensation circuitry, in accordance with an embodiment.

The correction factor applied by the back-emission nonlinearity compensation circuitry 302 may be more heavily non-linear for low pixel luminance (e.g., at lower gray levels) and may be less heavily non-linear (e.g., linear or near-linear) at higher pixel luminance (e.g., higher gray levels). Correction may be applied to each color component separately. FIG. 13 illustrates examples of nonlinearity correction provided by the back-emission nonlinearity compensation circuitry 302, according to embodiments of the present disclosure. The y-axis 352 represents gray levels corresponding to the pixel component 310 and the x-axis 354 represents normalized gray levels with respect to the pixel component 310. The curve 356 represents an upper bound of brightness levels with respect to the pixel component 310, and the curve 358 represents a lower bound of brightness levels with respect to the pixel component 310.

Figure 14:
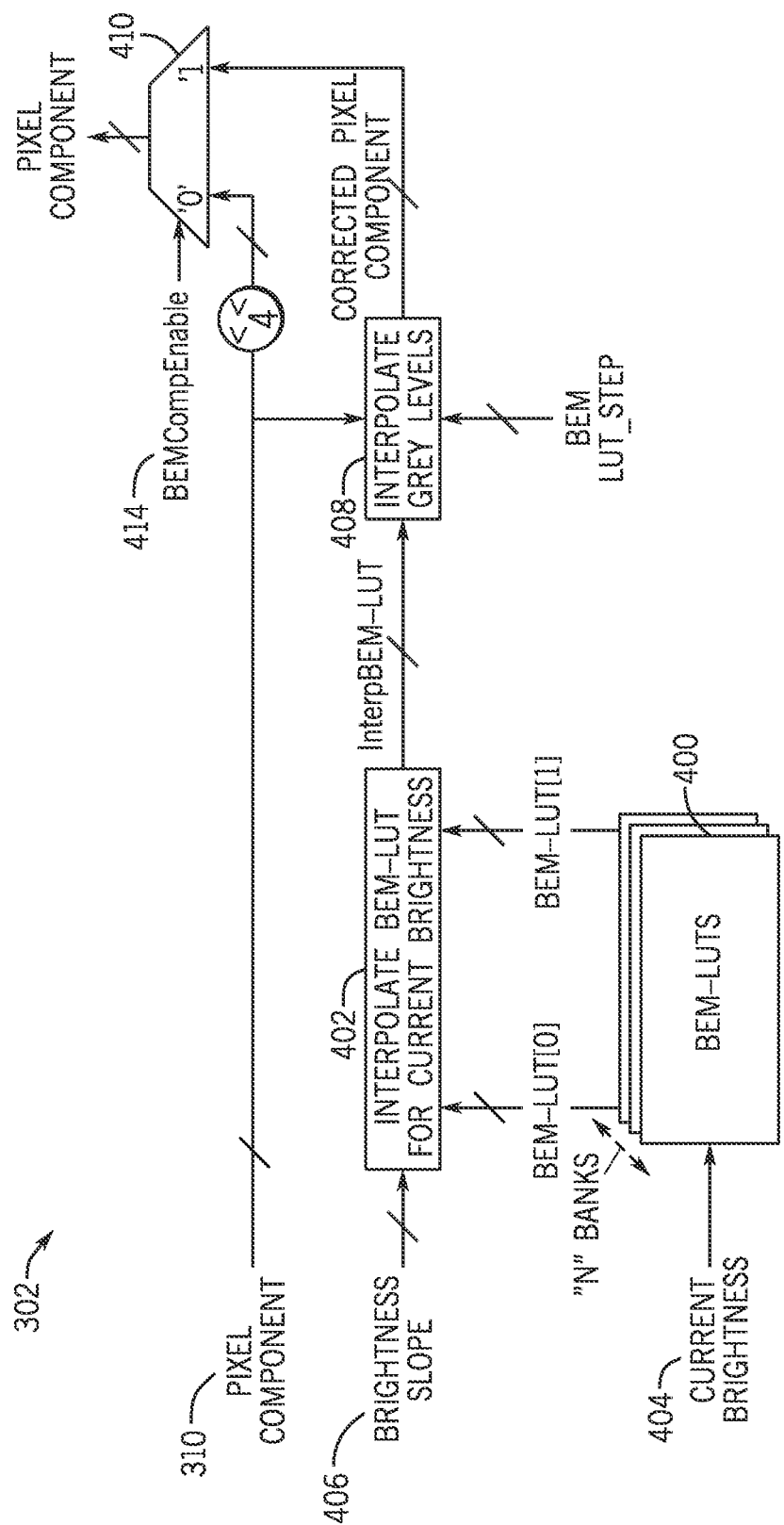
FIG. 14 is a flow diagram of the compensation applied by the back-emission nonlinearity compensation circuitry, in accordance with an embodiment.

FIG. 14 is a flow diagram of the compensation applied by the back-emission nonlinearity compensation circuitry 302, according to embodiments of the present disclosure. The back-emission nonlinearity compensation may be achieved via one or more back-emission nonlinearity compensation LUTs (BEM LUTs 400). The BEM LUTs 400 may support brightness and pixel value dependencies in hardware. The BEM LUTs 400 may include 128 entries and may be independent per color component. The entries of the BEM LUTs 400 may represent nonlinearity compensated output values corresponding to input pixel component values. The nonlinearity compensated output values may include a higher bit precision than the input pixel component values. For example, the nonlinearity compensated output values may include a bit precision of u0.16-u0.22 and the input pixel component values may include a bit precision of u0.12-u0.15. When an input pixel component value falls between intervals, the output values may be linearly interpolated using two bounding coordinates and entries.

In brightness-based interpolation (BBI) circuitry 402, for a given present brightness level 404, a pair of LUTs may be programmed, with the pair of LUTs being defined as the closest brightness levels that bound the present brightness level 404. A reciprocal of the slope for interpolating the present brightness level 404 in between the bounding brightness levels may be precomputed and programmed in the brightness slope register 406. The entries of the pair of LUTs may be interpolated based on the present brightness level for each color component. In gray level interpolation (GLI) circuitry 408, a corrected gray level may be determined from the result of the BBI circuitry 402 based on present pixel color component value. The multiplexer 410 may output the uncompensated pixel component 310 or the corrected (e.g., compensated) pixel component 310 based on the back-emission compensation enable signal 414.

Returning to FIG. 12, the back-emission nonlinearity compensation circuitry 302 may output the uncompensated pixel component 310 or the corrected pixel component 310 to one or more core units 166 corresponding to one or more region LUTs 168. The core units 166 may output an inter-region sum 314 based an inter-region sum enable signal 315 supplied to multiplexer 316, or may bypass the inter-region sum 314 and output the uncompensated pixel component 310 or the corrected pixel component 310 based on the inter-region sum enable signal 315 supplied to the multiplexer 316.

As will be discussed in greater detail below, the output of the multiplexer 316 is combined with coarse crosstalk estimate 318 via adder circuitry 320. The output of the adder circuitry 320 may be output directly to registers 322 via the multiplexer 324, or may undergo nonlinearity corrections via the nonlinearity correction circuitry 304, based on the state of the inter-region sum enable signal 315.

The ambient light sensor 90 may be impacted by back-emission crosstalk prior to an integration period due to photodiode memory effect, wherein a photodiode of the ambient light sensor 90 stores charge induced by a previous emission (e.g., back-emission crosstalk) from the electronic display 12. This charge has a decay rate in the photodiode that may be accounted for to accurately determine and compensate for the back-emission crosstalk. In particular, the photodiode memory effect may be caused by a combination of charges filled in the traps at shallow trench isolation or silicon ports or interfaces in the ambient light sensor 90. The filling and storing of charge may be nonlinear and wavelength-dependent. The draining of the photodiode may convert charges stored in the traps to photocurrent in a nonlinear manner and may depend on the fullness of the traps.

Figure 15:
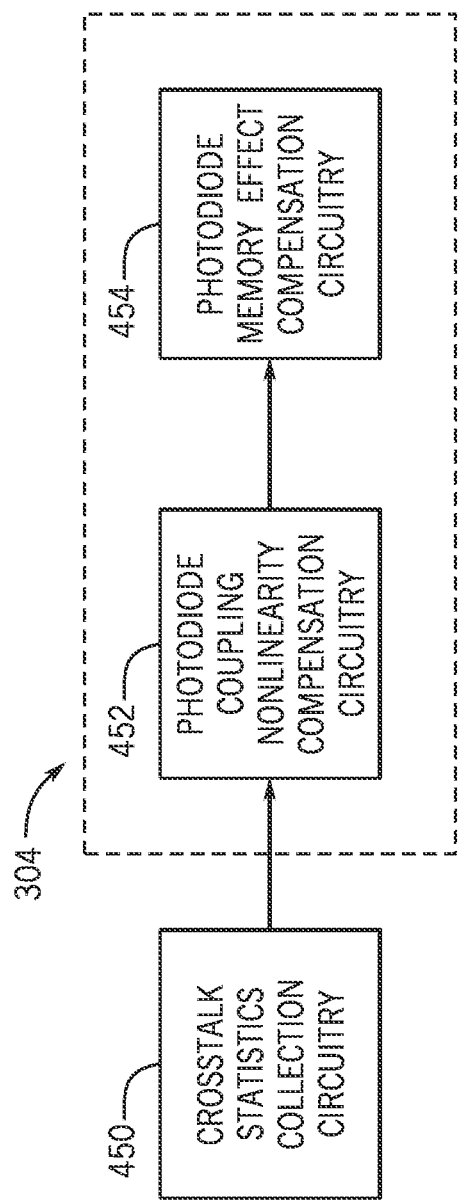
FIG. 15 is a flow diagram illustrating a detailed look at post-processing operations of the crosstalk compensation circuitry, including crosstalk statistics collection circuitry and multiple stages of the nonlinearity correction circuitry, in accordance with an embodiment.

Compensation of the photodiode memory effect may include multiple levels of nonlinearity correction. The compensation of the photodiode memory effect may include a compensation for the traps filling via a photodiode coupling nonlinearity compensation and a correction for the trap draining via a photodiode memory effect compensation. FIG. 15 is a flow diagram illustrating a detailed look at post-processing operations of the crosstalk compensation circuitry 300, including crosstalk statistics collection circuitry 450 and multiple stages of the nonlinearity correction circuitry 304, according to embodiments of the present disclosure. The crosstalk statistics collection circuitry 450 includes the region LUTs 168 and the calculation of the intra-region sum 212 and the inter-region sum 314, as discussed with respect to FIGS. 9, 10, and 12. The nonlinearity correction circuitry 304 includes a photodiode coupling nonlinearity compensation circuitry 452; and a photodiode memory effect compensation circuitry 454, that may compensate for the crosstalk on the ambient light sensor 90 by adjusting the image data to adjust luminance intensity levels associated with the display pixels 77.

Figure 16:
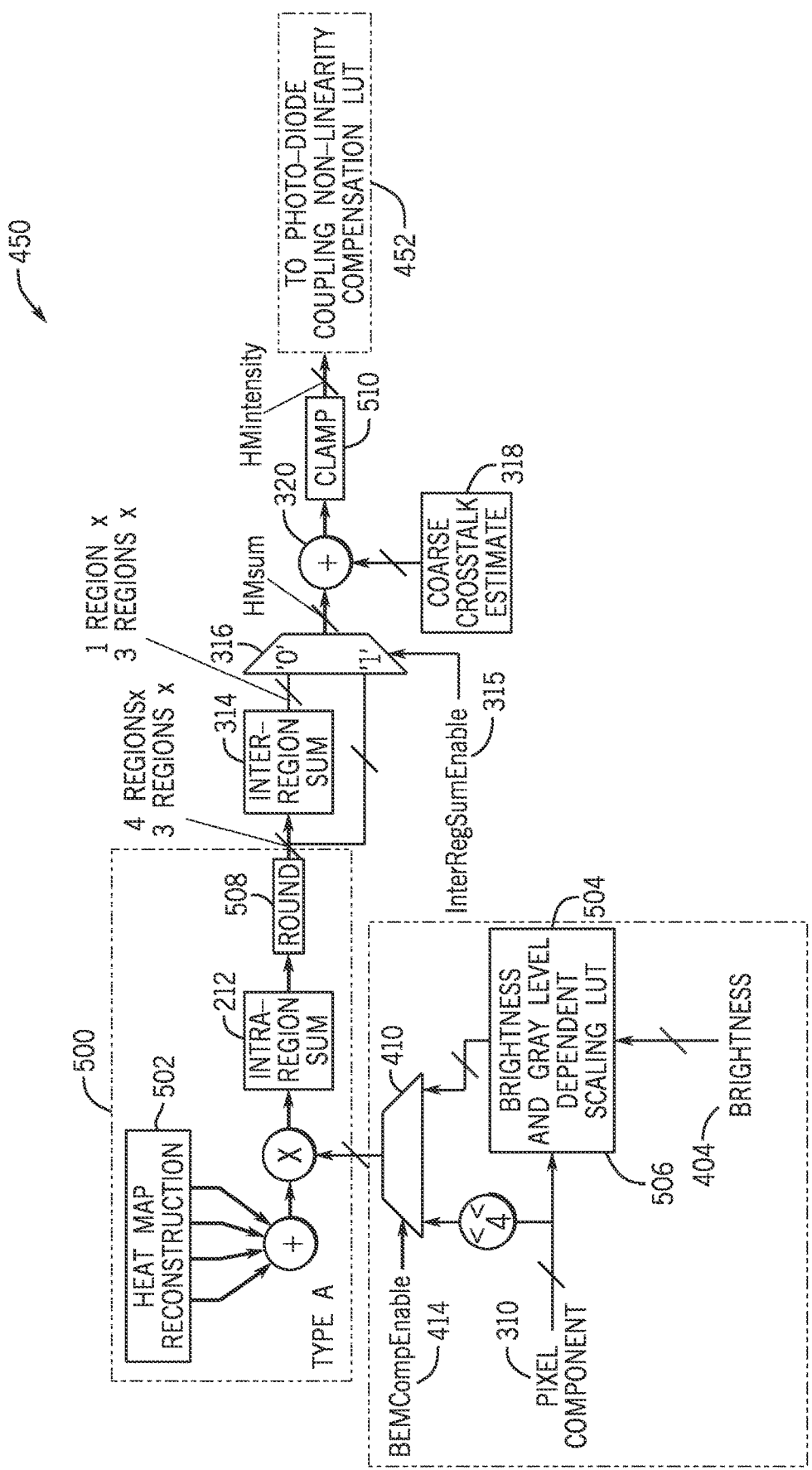
FIG. 16 is a flow diagram of the crosstalk statistics collection circuitry of FIG. 15, in accordance with an embodiment.

FIG. 16 is a flow diagram of the crosstalk statistics collection circuitry 450, according to embodiments of the present disclosure. Flow diagram 500 is a simplified version of the core unit 166, including a heat map 502 reconstruction based on the sets of SVD basis vectors 206. Flow diagram 504 is a simplified version of the flow diagram of the back-emission nonlinearity compensation circuitry described with respect to FIG. 14, including a combined brightness and gray level dependent scaling LUT 506. The intra-region sum 212 represents values of the heat map 502 accumulated for each region 168 and color component. Inter-region sum 314 represents the summation of all intra-region sums 212 into a single value per color component. If the inter-region sum enable signal 315 is high, multiplexer 316 outputs the inter-region sum 314. However, if the inter-region sum enable signal 315 is low, the multiplexer 316 outputs the intra-region sum 212. The intra-region sum 212 may be rounded by rounding circuitry 508. The output of the multiplexer 316 is summed with the coarse crosstalk estimate 318 and clamped to a particular bit precision (e.g., u36) via the clamping circuitry 510. The intra-region sum 212 and the inter-region sum 314 may include a more precise back-emission crosstalk estimate than the coarse crosstalk estimate 318. The sum of the multiplexer 316 output and the coarse crosstalk estimate 318 is output to photodiode coupling nonlinearity compensation circuitry, as will be discussed in greater detail with respect to FIG. 17.

Figure 17:
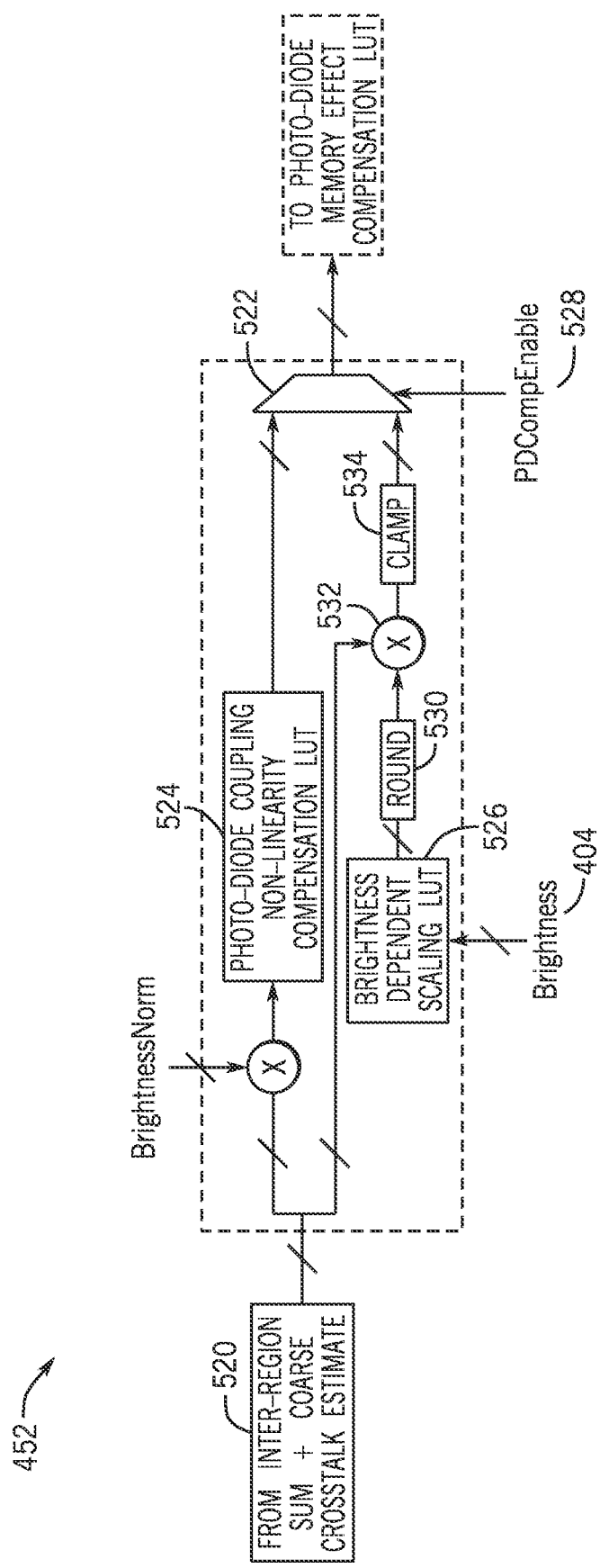
FIG. 17 is a flow diagram relating to photodiode coupling nonlinearity compensation circuitry of FIG. 15, in accordance with an embodiment.

FIG. 17 is a flow diagram relating to photodiode coupling nonlinearity compensation circuitry 452, according to embodiments of the present disclosure. Photodiode coupling nonlinearity compensation targets the nonlinear filling of traps in the photodiode of the ambient light sensor 90. The trap filling may depend on wavelength and color primary and may be addressed by applying correction to each color primary of the intra-region sum 212. The correction factor may be heavily nonlinear for low gray levels, and may be less heavily nonlinear (e.g., linear or near-linear) for higher gray levels.

The photodiode coupling nonlinearity compensation circuitry 452 receives an input signal 520 from the crosstalk statistics collection circuitry 450. The multiplexer 522 may enable a compensation via the photodiode coupling LUT 524 or a brightness dependent scaling LUT 526 based on the state of the photodiode compensation enable signal 528. The photodiode coupling LUT 524 may be enabled based on whether the input signal 520 includes the inter-region sum 314 or the intra-region sum 212. The photodiode coupling LUT 524 compensation may be applied if the inter-region sum 314 is provided as the input signal 520. However, the brightness dependent scaling LUT 526 compensation may be applied if the inter-region sum 314 or the intra-region sum 212 is provided as the input signal 520. If the brightness dependent scaling LUT 526 provides the compensation, the output of the brightness dependent scaling LUT 526 may be rounded at rounding circuitry 530, multiplied by the input signal 520 via multiplier circuitry 532, and clamped via the clamping circuitry 534.

Figure 18:
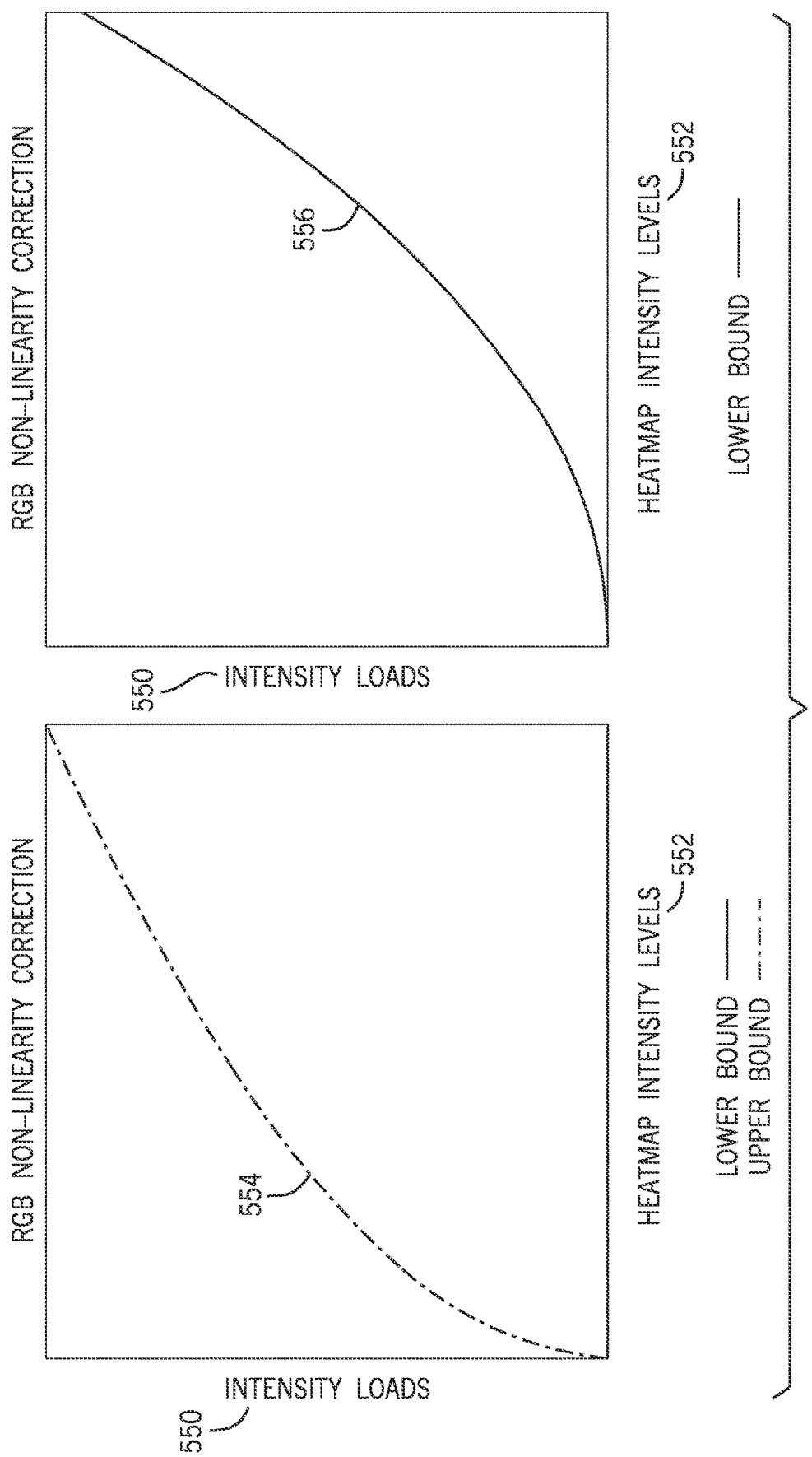
FIG. 18 illustrates examples of nonlinearity correction provided by the photodiode coupling nonlinearity compensation circuitry of FIG. 17, in accordance with an embodiment.

FIG. 18 illustrates examples of nonlinearity correction provided by the photodiode coupling nonlinearity compensation circuitry 452, according to embodiments of the present disclosure. The y-axis 550 represents intensity levels and the x-axis 552 represents heat map intensity levels. The curve 554 represents an upper bound of brightness levels with respect to the pixel component 310, and the curve 556 represents a lower bound of brightness levels with respect to the pixel component 310.

Figure 19:
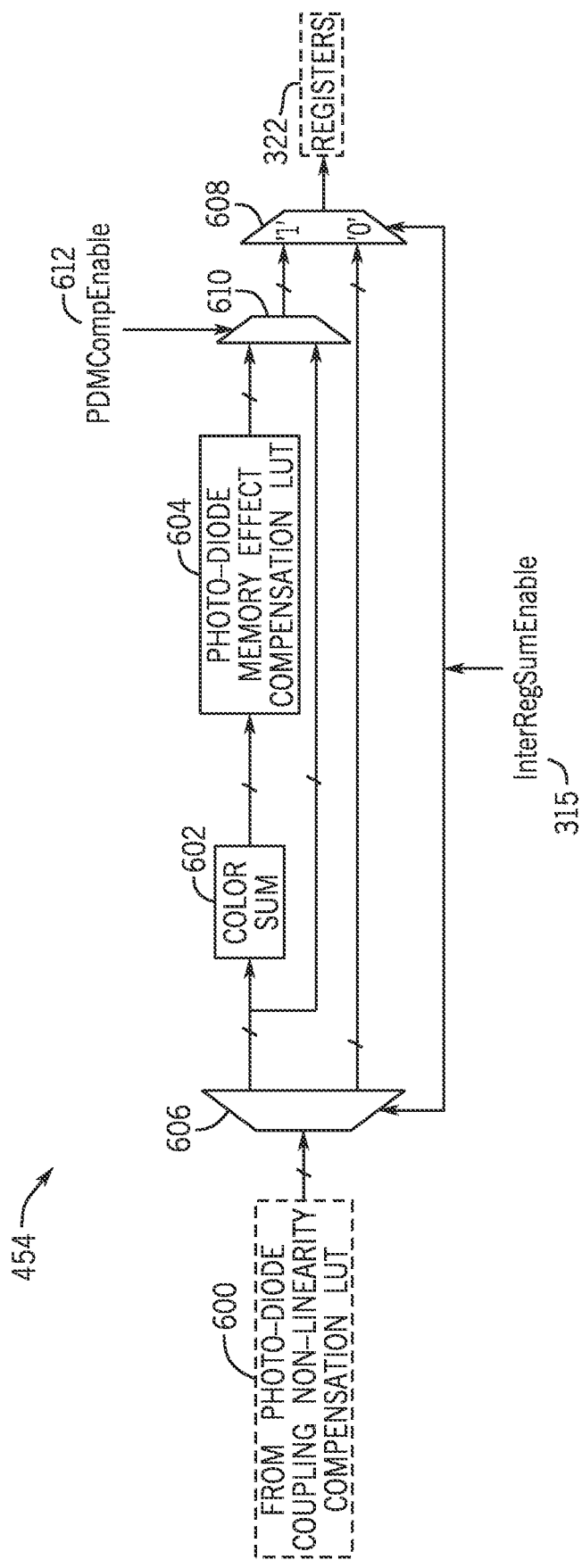
FIG. 19 is a flow diagram relating to photodiode memory compensation circuitry of FIG. 15, in accordance with an embodiment.

FIG. 19 is a flow diagram relating to photodiode memory effect compensation circuitry 454, according to embodiments of the present disclosure. The nonlinear draining of the charges from the traps in the photodiode may depend on the charge trap saturation and may lead to the photodiode memory effect discussed with respect to FIG. 15. The photodiode memory effect may impact the back-emission crosstalk and may include a conversion of the heat map intensity to crosstalk counts. The photodiode memory effect compensation circuitry 454 may apply a gray level dependent correction factor on a sum of all color primaries of the heat map 502 output. The correction factor may be heavily nonlinear for low gray levels, and may be less heavily nonlinear (e.g., linear, near-linear) for higher gray levels.

The photodiode memory effect compensation circuitry 454 may receive an input signal 600 from the photodiode coupling nonlinearity compensation circuitry 452, and includes color sum calculation circuitry 602 and a photodiode memory compensation LUT (PDM LUT) 604. The entries of the PDM LUT 604 may be defined for a single color component and represent nonlinearity compensated output values corresponding to input inter-region sum 314 intensity values. When an input pixel component value falls between intervals, the output values may be linearly interpolated using two bounding coordinate and entries. Corrected heat map intensities may be interpolated from the PDM LUT 604 based on pixel gray levels. The photodiode memory effect compensation circuitry 454 includes multiplexers 606, 608, and 610.

The multiplexers 606 and 608 may receive the inter-region sum enable signal 315. If the inter-region sum enable signal 315 is low, the photodiode memory effect compensation circuitry 454 may bypass the photodiode memory compensation and output the input signal 600 from the photodiode coupling nonlinearity compensation circuitry 452 corresponding to the four region LUTs 168A, 168B, 168C, and 168D to the registers 322. That is, if the inter-region sum enable signal 315 is low, the input signal 600 includes the intra-region sum 212. If the inter-region sum enable signal 315 is high and a PDM compensation enable signal 612 is low, the photodiode memory effect compensation circuitry 454 may bypass the photodiode memory compensation and output the uncompensated input signal 600 from the photodiode coupling nonlinearity compensation circuitry 452 corresponding to one region (e.g., the combination of the region LUTs 168 combined by the inter-region sum 314). If the PDM compensation enable signal 612 is high, color sum calculation circuitry 602 and the PDM LUT 604 may apply the photodiode memory compensation and output the compensated input signal 600 corresponding to the one region to the registers 322 to compensate for the photo-diode memory effect experienced by the ambient light sensor 90.

Figure 20:
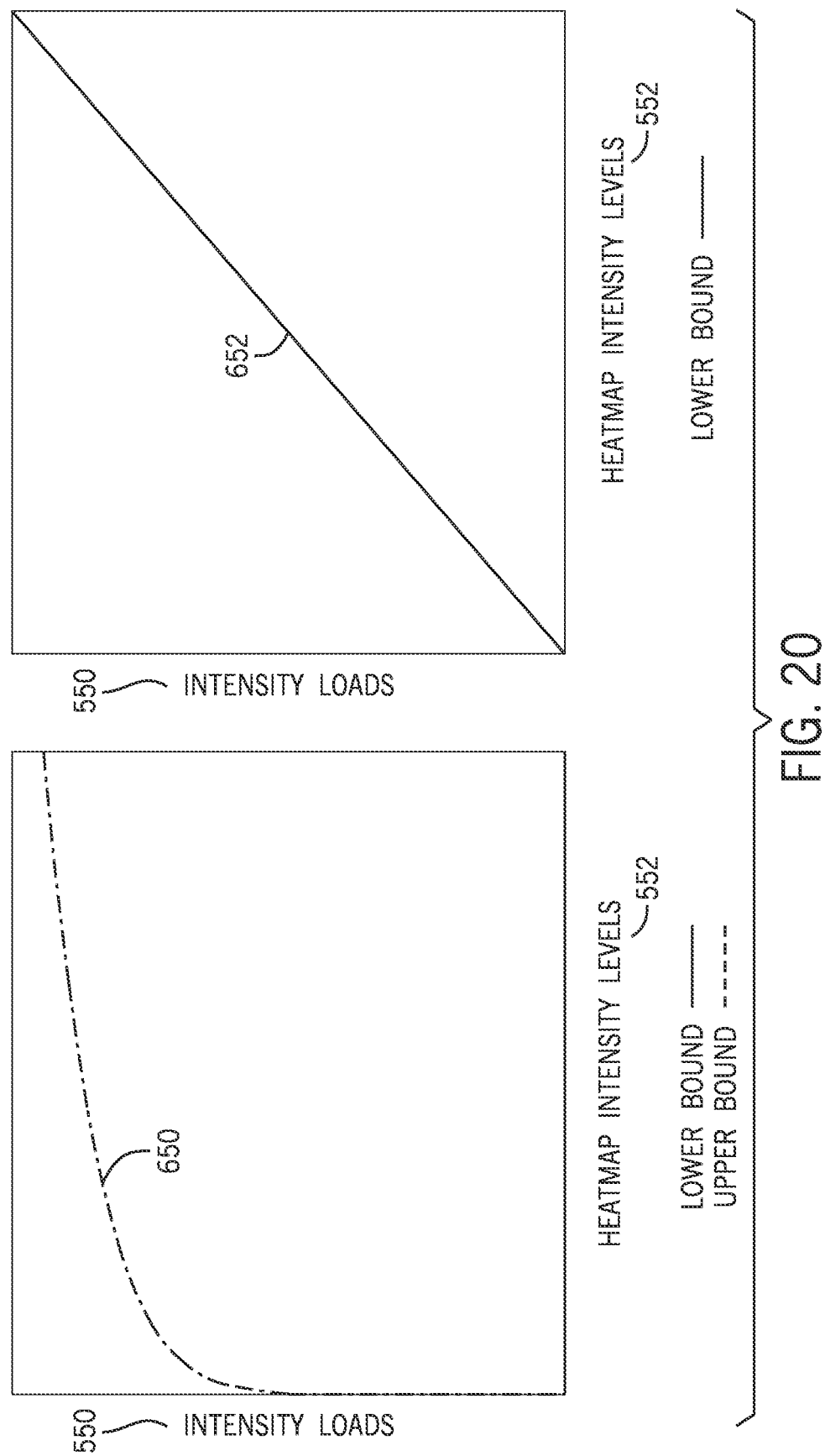
FIG. 20 illustrates examples of nonlinearity correction provided by the photodiode memory compensation circuitry of FIG. 19, in accordance with an embodiment.

FIG. 20 illustrates examples of nonlinearity correction provided by the photodiode memory effect compensation circuitry 454, according to embodiments of the present disclosure. The y-axis 550 represents intensity levels and the x-axis 552 represents heat map intensity levels. The curve 650 represents an upper bound of brightness levels with respect to the pixel component 310, and the curve 652 represents a lower bound of brightness levels with respect to the pixel component 310.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device, comprising:
an electronic display comprising pixels, the electronic display configured to:
display a first frame of image data using the pixels during an emission period;
pause the display of image data on the pixels during a non-emission period, the non-emission period following the emission period;
a light sensor coupled to the electronic display, wherein the light sensor is configured to capture light sensor data during the non-emission period; and
processing circuitry coupled to the electronic display and light sensor, the processing circuitry configured to:
determine a compensation value, wherein the compensation value corresponds to residual charge on the light sensor during a non-emission period;
compensate the light sensor data based on the compensation value; and
adjust a second frame of image data based on the compensated light sensor data.

2. The electronic device of claim 1, wherein the processing circuitry is configured to determine a nonlinearity between the residual charge and light emitted during the emission period.

3. The electronic device of claim 2, wherein the processing circuitry is configured to apply a correction factor to the light sensor data based on the nonlinearity between the residual charge and light emitted during the emission period.

4. The electronic device of claim 3, wherein the correction factor comprises a gray level adjustment applied to the light sensor data.

5. The electronic device of claim 3, wherein the correction factor is applied to each color component of a plurality of color components associated with the pixels.

6. The electronic device of claim 1, wherein the processing circuitry is configured to determine characteristics of ambient light via a plurality of nonlinearity compensation lookup tables (LUTs).

7. The electronic device of claim 1, wherein the processing circuitry is configured to determine ambient light and the residual charge associated with a number of display regions of the electronic display.

8. Image processing circuitry comprising:
crosstalk statistics collection circuitry configured to receive ambient light data from a sensor of an electronic display and collect statistics on the ambient light data to determine crosstalk in the ambient light data due to residual charge on the sensor that remains during a non-emission period based on a previous light emission from the electronic display;
first compensation circuitry configured to determine and apply a first compensation based on a photodiode coupling correction to the ambient light data to compensate for the crosstalk due to the residual charge; and
second compensation circuitry configured to determine a second compensation based on a photodiode memory effect compensation to the ambient light data to compensate for the crosstalk due to the residual charge.

9. The image processing circuitry of claim 8, wherein the first compensation circuitry is configured to determine the first compensation based on receiving a sum of pixel values corresponding to a region of the electronic display.

10. The image processing circuitry of claim 9, wherein the first compensation circuitry is configured to apply the first compensation by compensating each color primary associated with the sum of pixel values corresponding to the region of the electronic display.

11. The image processing circuitry of claim 8, wherein the second compensation circuitry comprises one or more photodiode memory compensation lookup tables (PDM LUTs).

12. The image processing circuitry of claim 11, wherein each entry of the PDM LUTs comprises a single color component and represents nonlinearity compensated output values corresponding to intensity values of a sum of pixel values corresponding multiple regions of the electronic display.

13. A tangible, non-transitory, computer-readable medium, comprising computer-readable instructions that, when executed by one or more processors of an electronic device, cause the electronic device to:
receive ambient light data from a sensor;
determine crosstalk in the ambient light data due to a previous light emission from an electronic display causing hysteresis in a photodiode of the sensor that remains during a non-emission period of an electronic display;
determine a compensation to the ambient light data to compensate for the hysteresis present on the sensor during the non-emission period due to the previous light emission; and
apply the compensation.

14. The tangible, non-transitory, computer-readable medium of claim 13, wherein executing the instructions causes the electronic device to collect the ambient light data associated with a plurality of display regions associated with the sensor.

15. The tangible, non-transitory, computer-readable medium of claim 14, wherein causing the electronic device to collect the ambient light data comprises causing the electronic device to collect pixel statistics corresponding to each display region of the plurality of display regions based on pixel coordinates and pixel components associated with pixels corresponding to the pixel coordinates, and apply a two-dimensional weight to the pixel components.

16. The tangible, non-transitory, computer-readable medium of claim 15, wherein causing the electronic device to apply the two-dimensional weight to the pixel components comprises causing the electronic device to apply the two-dimensional weight to each of a plurality of basis vectors.

17. The tangible, non-transitory, computer-readable medium of claim 16, wherein causing the electronic device to collect the ambient light data comprises causing the electronic device to generate an intra-region sum for one or more display regions of the plurality of display regions, wherein the intra-region sum comprises a product of the pixel components and a sum of the plurality of basis vectors.

18. The tangible, non-transitory, computer-readable medium of claim 13, wherein causing the electronic device to determine a compensation to the ambient light data comprises causing the electronic device to determine a brightness-dependent scaling factor between the crosstalk in the ambient light data due to the previous light emission and ambient light data due to a present light emission.

19. The tangible, non-transitory, computer-readable medium of claim 18, wherein causing the electronic device to determine the brightness-dependent scaling factor comprises causing the electronic device to select one of a plurality of gain lookup tables (LUTs) based on a present brightness level of the electronic display.

20. The tangible, non-transitory, computer-readable medium of claim 19, wherein each gain LUT of the plurality of gain LUTs corresponds to a unique range of brightness levels.

* * * * *